United States Patent [19]

Broadhurst

[11] Patent Number: 5,278,418
[45] Date of Patent: Jan. 11, 1994

[54] LUGGAGE EXPLOSIVE DETECTOR

[76] Inventor: John H. Broadhurst, 1560 Sumpter Ave. North, Golden Valley, Minn. 55427

[21] Appl. No.: 864,319

[22] Filed: Apr. 6, 1992

Related U.S. Application Data

[63] Continuation-in-part of Ser. No. 492,907, Mar. 13, 1990, abandoned.

[51] Int. Cl.$^5$ ............................................. G01N 23/20
[52] U.S. Cl. ............................ 250/390.04; 250/390.10
[58] Field of Search .................... 250/390.04, 390.10, 250/390.07; 378/57

[56] References Cited

U.S. PATENT DOCUMENTS 4,864,142  9/1989  Gomberg .................. 250/390.04

OTHER PUBLICATIONS

Grodzins, L., "Nuclear & X-ray, Technologies for Airport Security" MIT Symposium Apr. 17, 1990.

Primary Examiner—Paul M. Dzierzynski
Assistant Examiner—Richard Hanig
Attorney, Agent, or Firm—Herman H. Bains

[57] ABSTRACT

A method for detecting the presence of a predetermined amount of oxygen and nitrogen in a luggage type container as a screening technique for determining the presence of an explosive in the container. Generating and accelerating a beam of monoenergetic protons at a neutron generating target formed of boron. Rapidly and periodically subjecting the proton beam to an energy degrading medium upstream of the neutron generating target to thereby selectively degrade the energy of the protons of the proton beam during the time the median is in place while allowing the energy of the proton beam to remain at the original energy when the degrading median is removed. Directing the energy variant proton beam at the boron target to generate an energy variant neutron beam, the neutron beam containing on resonant neutrons at a resonant energy of nitrogen or oxygen nuclei and containing off resonant neutrons outside the resonant energy of the nuclei of nitrogen and oxygen. First detecting, measuring and comparing on resonant neutrons removed by interactions with nuclei of oxygen, and off resonant neutron passing through the luggage container, and, in response to a determination of the presence of predetermined amount of oxygen in the container, then detecting, measuring and comparing on resonant neutrons removed by interactions with nuclei of nitrogen, and off resonant neutrons passing through the luggage container for determining the presence of a predetermined level of nitrogen.

8 Claims, 8 Drawing Sheets

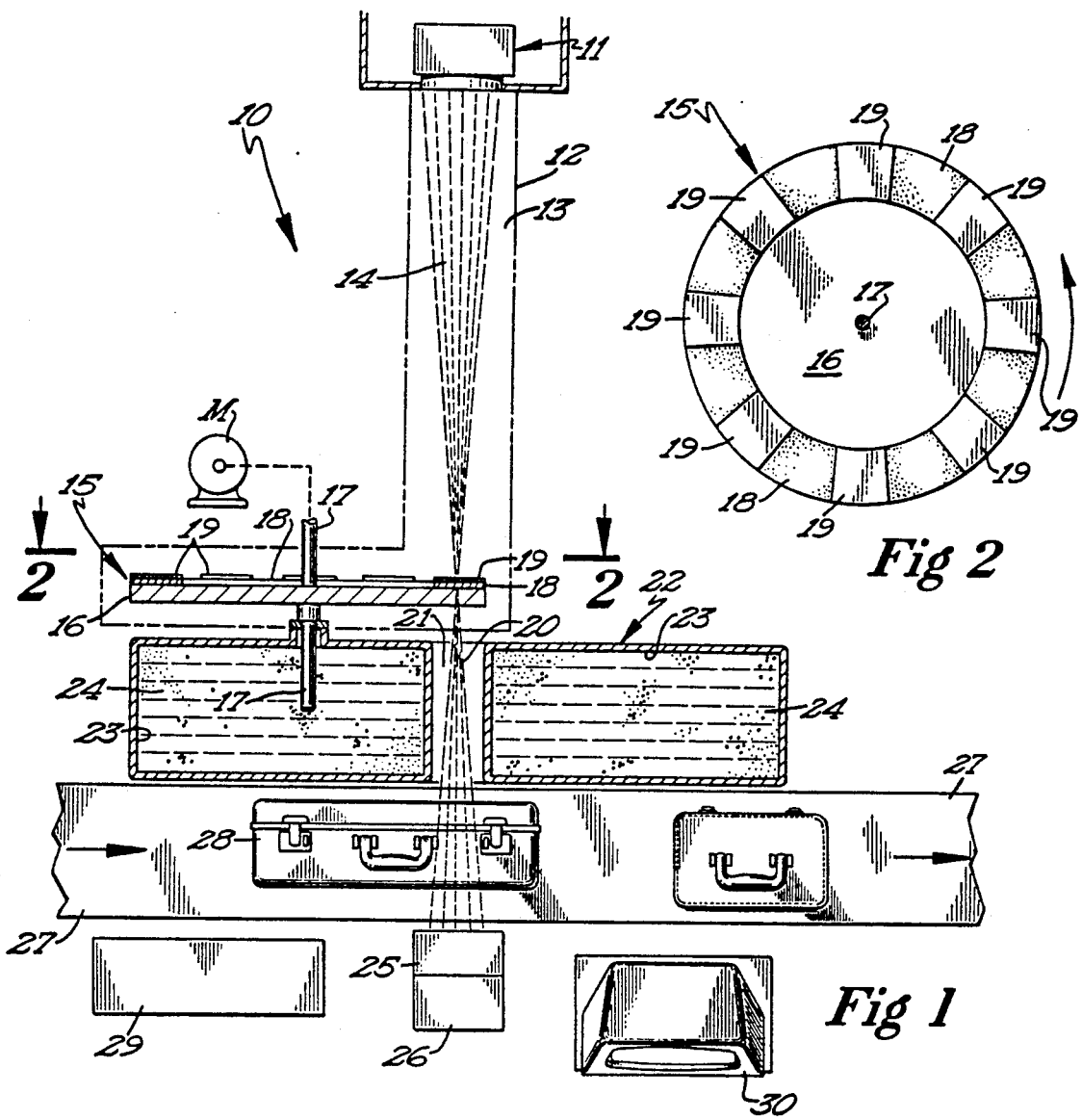
*Fig 2*
*Fig 1*
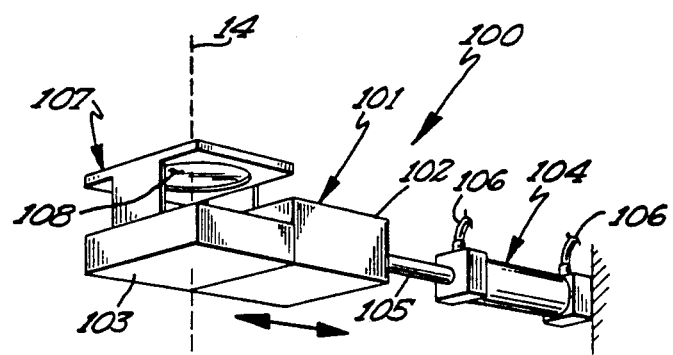
*Fig 6*

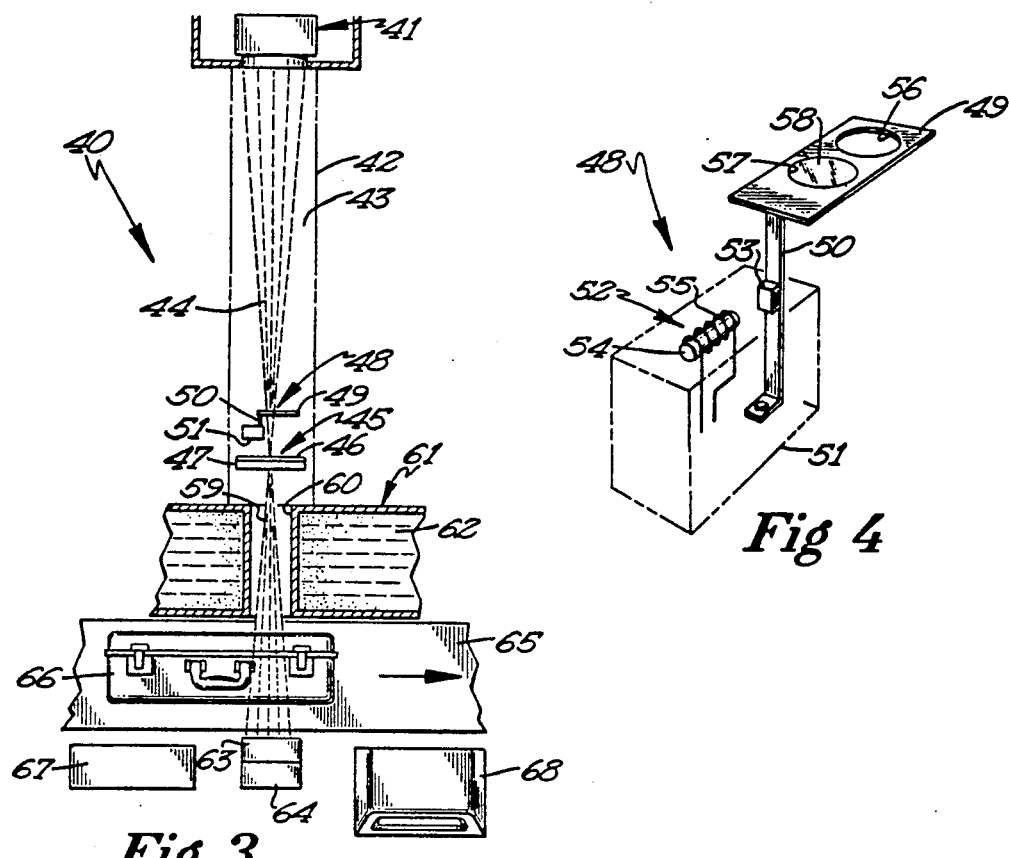
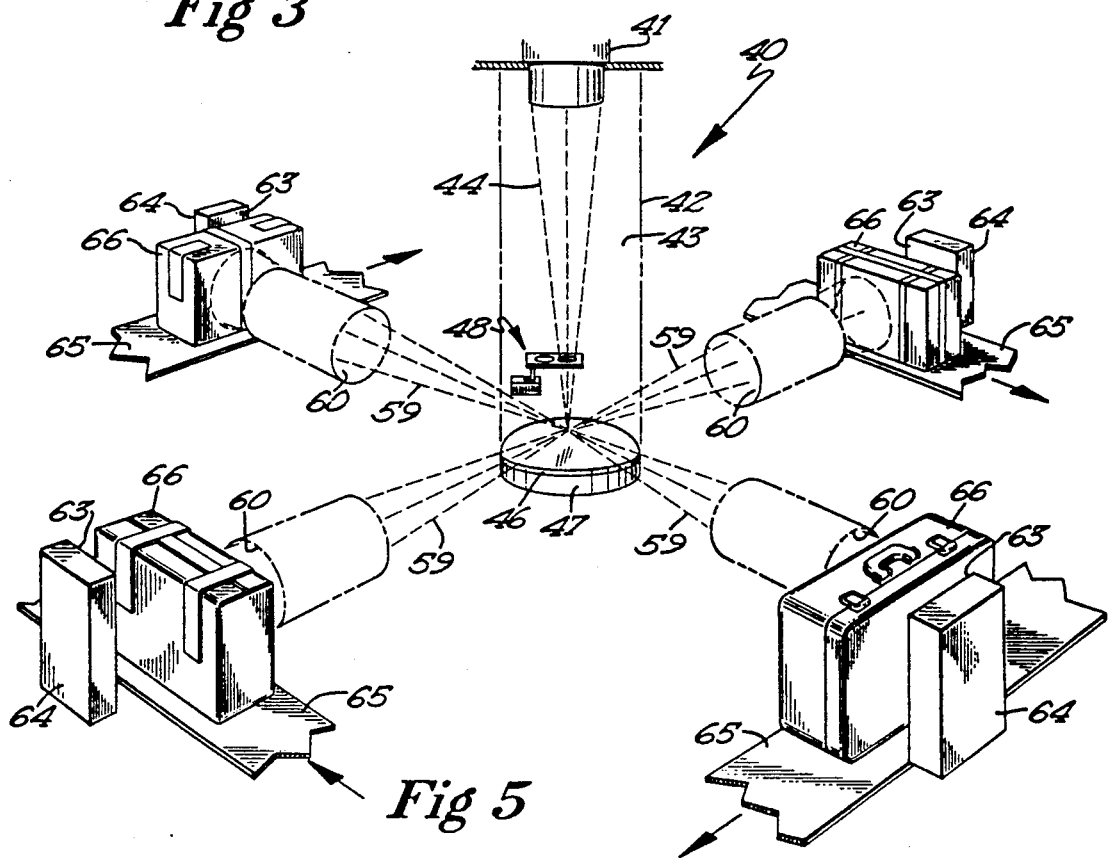

LUGGAGE EXPLOSIVE DETECTOR

This invention relates to a method for detecting explosives in luggage, containers, and the like, by resonant neutron absorption; it is a continuation-in-part of application Ser. No. 07/492,907, filed Mar. 13, 1990 and is now abandoned.

BACKGROUND OF THE INVENTION

For many years, it has been realized that successful explosives are based on a nitrate compound. This realization is based on the recognition that the success of an explosive depends on the very rapid oxidation of a fuel to produce gaseous products, e.g., carbon dioxide, water vapor, etc. In gunpowder, for example, carbon and sulphur provide the fuels, and potassium nitrate (saltpetre) provides the oxygen necessary to oxidize them. If the potassium nitrate was omitted, the carbon and sulphur would necessarily depend on external atmospheric oxygen, and would only burn at the outside surface, the flames spreading slowly through the mass, creating no discernible explosive effect.

Gunpowder is a heterogeneous mixture of the three constituents, and the rate of burning is dependent on the grain size, since the interior of each grain is shielded from oxidation. It was, therefore, realized that, if the nitrate radical could be attached to a fuel at the molecular level, the oxidation would proceed much more quickly, producing the class of substances known as "high explosives".

The source of oxygen for explosives requires that the oxygen should be stably bound at the highest expected storage temperatures, but should be available instantly at flame temperatures. So far, only the nitrate radical has been found to have these properties. Radicals, such as sulphate, or sulphite, are too firmly bound to dissociate and release oxygen at flame temperatures.

Therefore, one way to detect concealed explosives is to sense the presence of nitrogen, or, more preferably, nitrogen and oxygen in larger quantities than normally expected in the luggage of air traffic travelers. The probe used to detect these elements must be both very penetrating and element-sensitive. In practice, this limits the available probes to uncharged particles, either photons (gamma rays) or neutrons. Many Patents have been issued on the use of both of these probes, most of which are expired, while recent installation of commercial explosive protection equipment at airports has produced newspaper and other articles about the principles of operation.

So far, the prior art processes used to detect concealed explosives have irradiated suspicious containers with thermal or fast neutrons, and thereafter have looked for emitted gamma rays produced by the absorption of a neutron by the nitrogen nucleus and the subsequent decay of the nitrogen-15 daughter nucleus. An alternative prior art method has been to irradiate the container with gamma rays of the correct energy to excite an energy level in the nitrogen-14 nucleus. This excited nitrogen nucleus promptly returns to its lowest energy state, emitting a cascade of gamma rays in the process. Detecting this cascade, once again, signals the presence of nitrogen. Both of these prior art processes can be adapted to look for characteristic gamma rays of oxygen, and, in principle, enable the detection of unexpected nitrates in the containers or luggage.

For example, U.S. Pat. No. 3,146,349 to Jordan, discloses a method of detecting explosives in containers in which the explosive is seeded with a neutron absorber material (boron), and, when the luggage is irradiate with thermal neutrons, any gamma rays directly emitted by the absorber boron material are detected by suitable detectors.

In U.S. Pat. No. 3,832,565 to Bartko, an explosive detection apparatus is provided, which produces thermal or fast neutrons that irradiate the luggage and subsequently produce the emission of gamma rays, in response to the presence of nitrogen in the luggage.

In U.S. Pat. No. 3,594,577 to Loveday, another gamma radiation indicating or detecting apparatus is disclosed.

In U.S. Pat. No. 3,308,296 to Cowan, a hidden explosive detector is provided, which detects gamma ray cascades emitted from a long-life low activity radioactive tracer, which as been seeded into the explosive.

In U.S. Pat. No. 3,124,679 to Tittmen et al, a method and apparatus is disclosed for detecting the presence of a selected element by irradiating the element with thermal or fast neutrons and observing the emitted gamma rays produced by the absorption of a neutron by the element to be detected.

In U.S. Pat. No. 4,864,142 to Gomberg, a method and apparatus is disclosed for detecting the presence of a preselected element (contraband) in an object such as a suitcase. In this particular system a neutron beam is directed into the object being interrogated and the resonantly scattered neutrons by the preselected element are measured.

SUMMARY OF THE INVENTION

It is an object of this invention to provide a novel method of detehing the presence of oxygen and nitrogen (nitrates) in a container as a screening technique for determining the presence of an explosive in containers which are transported by commercial passenger aircraft.

Specifically, it is an object of this invention to provide a nuclear detection method for detecting explosives concealed in containers in which a primary beam of neutrons is measured to indicate the presence of predetermined amount of nitrogen or oxygen.

In carrying out this invention, a monoenergetic beam of protons is directed at a neutron generating target to produce a proton-neutron reaction as a neutron generation process. The monoenergetic proton beam is rapidly and periodically subjected to an energy degrading medium upstream of the nuclear generating target or to an energy degrading technique to thereby degrade the energy of certain protons, while the energy of other protons remains unaffected. The periodic energy variant proton beam is directed against the target material to cause a proton-neutron reaction and produce a neutron beam containing on resonant neutrons at a resonant energy of oxygen or nitrogen, and off resonant neutrons outside a resonant energy of oxygen or nitrogen. In the preferred embodiment, oxygen nuclei will be interrogated first, and if found in predetermined levels, the nitrogen nuclei will be interrogated. A container is moved in a path along the orthogonal axis of an array of neutron detectors positioned downstream of the path of travel of the containers to be examined.

The container is irradiated by the neutron beam, and the detectors measure and compare the difference between the neutrons absorbed (inclusive absorption by all nuclear processes including scattering) by the elements being interrogated in the container when the neutron energy alternately is and is not equal to an absorption resonance energy. In the preferred embodiment, the nitrogen and oxygen excesses of each measurement point are displayed as color changes or hues on a video screen display.

In the present method, a high resolution x-ray image is taken of the container before the latter reaches the neutron detector station, so that the final displayed image superimposes the color change elemental information on the x-ray image. This assists the equipment operator in determining if further investigation of the container is indicated. In the present method, the primary beam of neutrons is measured, rather than using the techniques of the prior art systems for measuring emitted gamma rays or scattered neutrons.

FIGURES OF THE DRAWING

FIG. 1 is a diagrammatic top plan view of the apparatus used for carrying out the novel method;

FIG. 2 is a front elevational view of one of the components of the apparatus diagrammatically illustrated in FIG. 1;

FIG. 3 is a diagrammatic top plan view of a modified form of the apparatus used for carrying out the novel method;

FIG. 4 is a front elevational view of one of the components of the apparatus diagrammatically illustrated in FIG. 3; and FIG. 5 is a diagrammatic perspective view illustrating a manner in which the apparatus may be used to simultaneously irradiate luggage or containers at four separate detection stations.

FIG. 6 is a diagrammatic perspective view of a modified form of the neutron generating target assembly.

Figure 7:
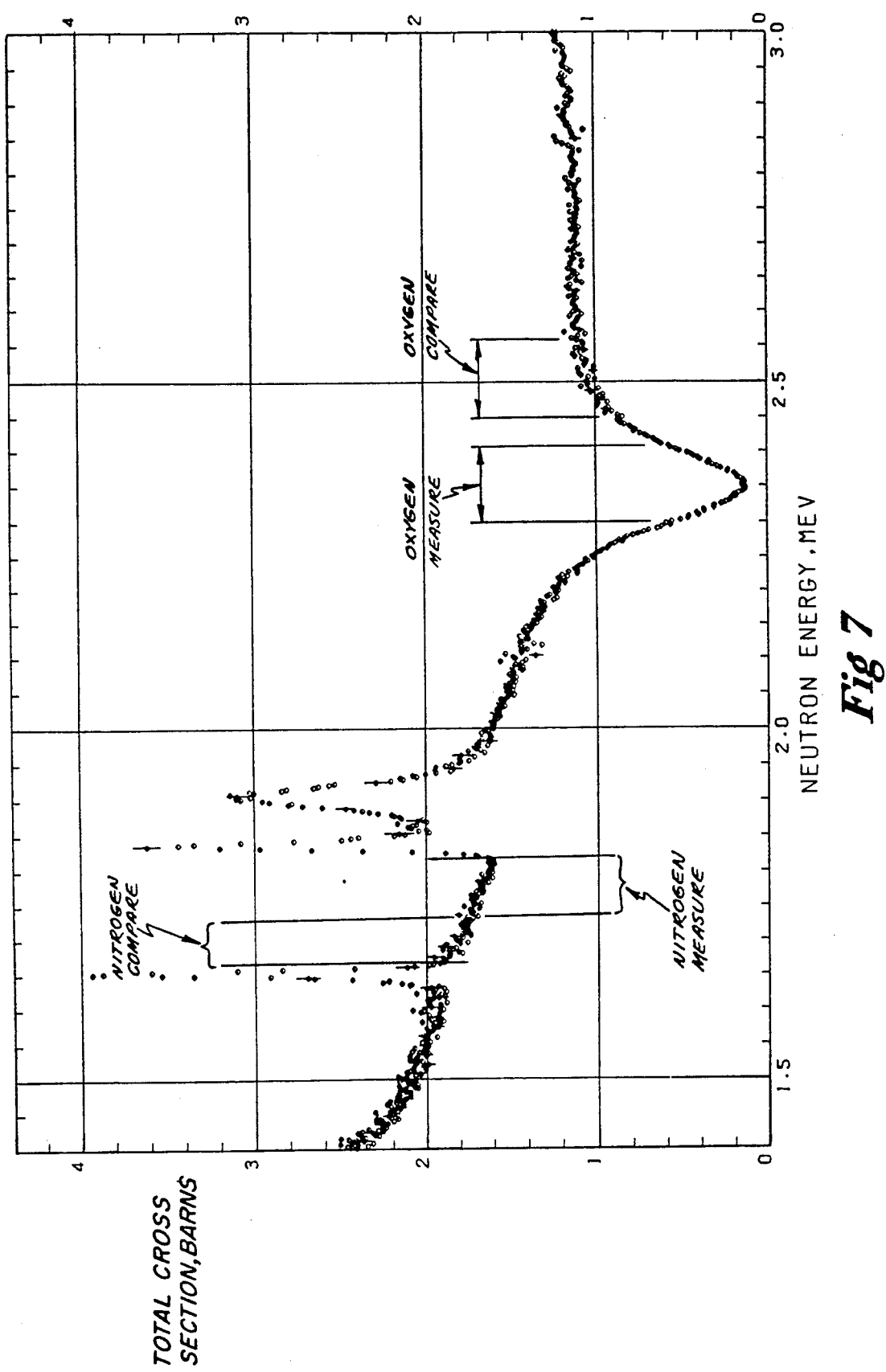
FIG. 7 is designated Chart 1 and is the National Bureau of Standards Resonant Absorption Spectrum for Oxygen.
Figure 8:
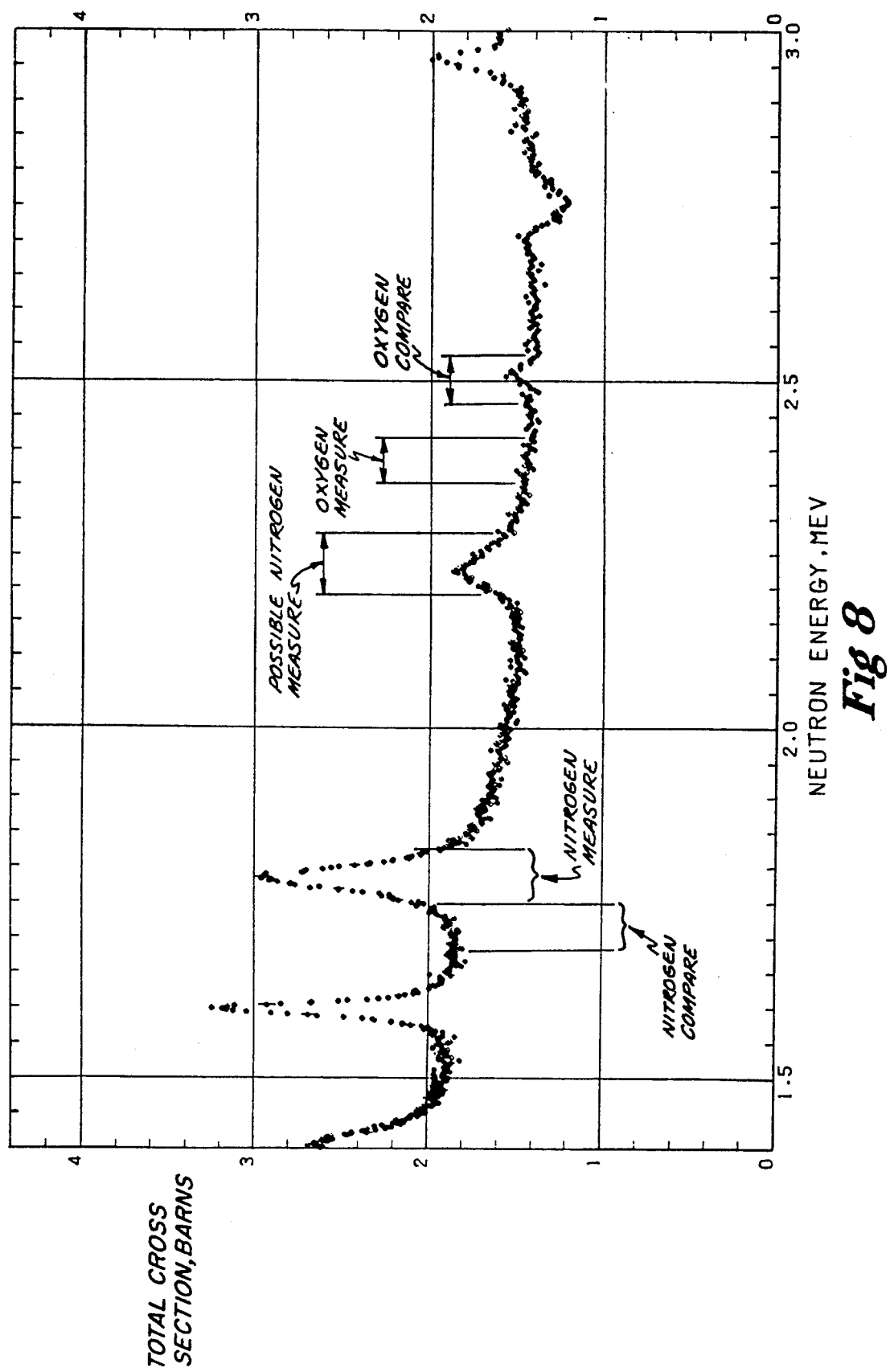
FIG. 8 is designated Chart 2 and is the National Bureau of Standards Resonant Absorption Spectrum for Nitrogen.
Figure 9:
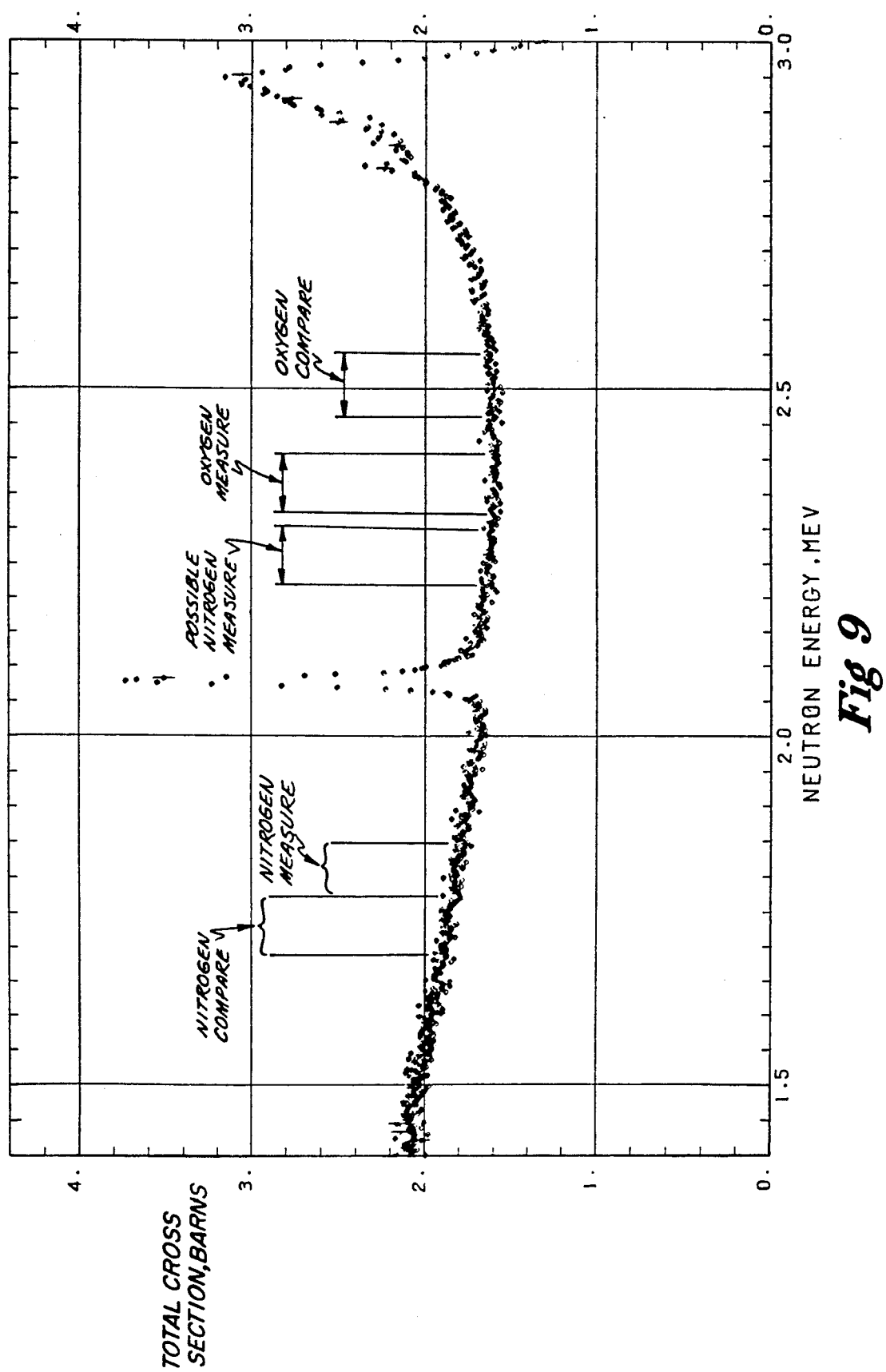
FIG. 9 is designated Chart 3 and is the National Bureau of Standards Resonant Absorption Spectrum for Carbon.
Figure 10:
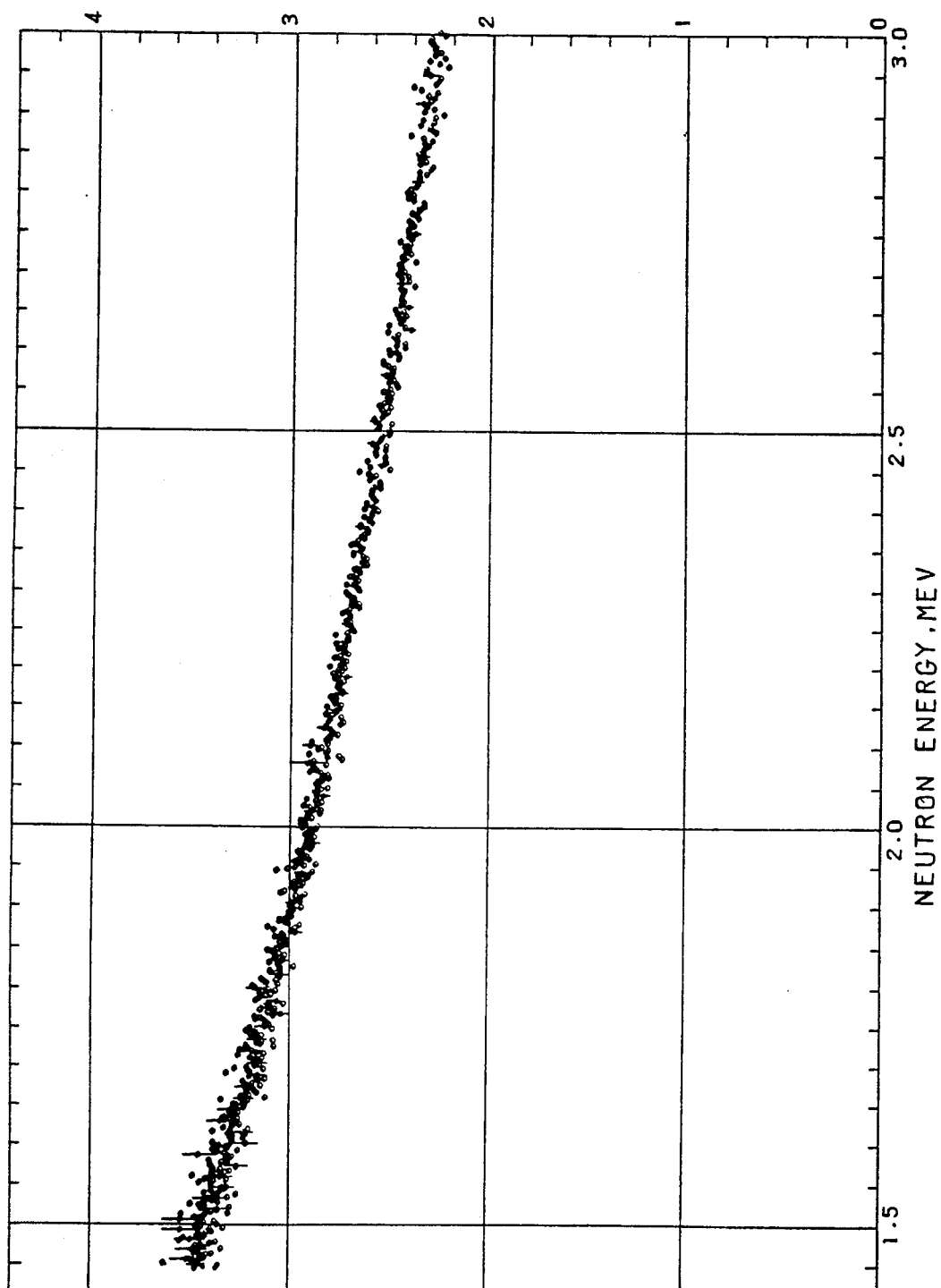
FIG. 10 is designated Chart 4 and is the National Bureau of Standards Resonant Absorption Spectrum for Hydrogen.
Figure 11:
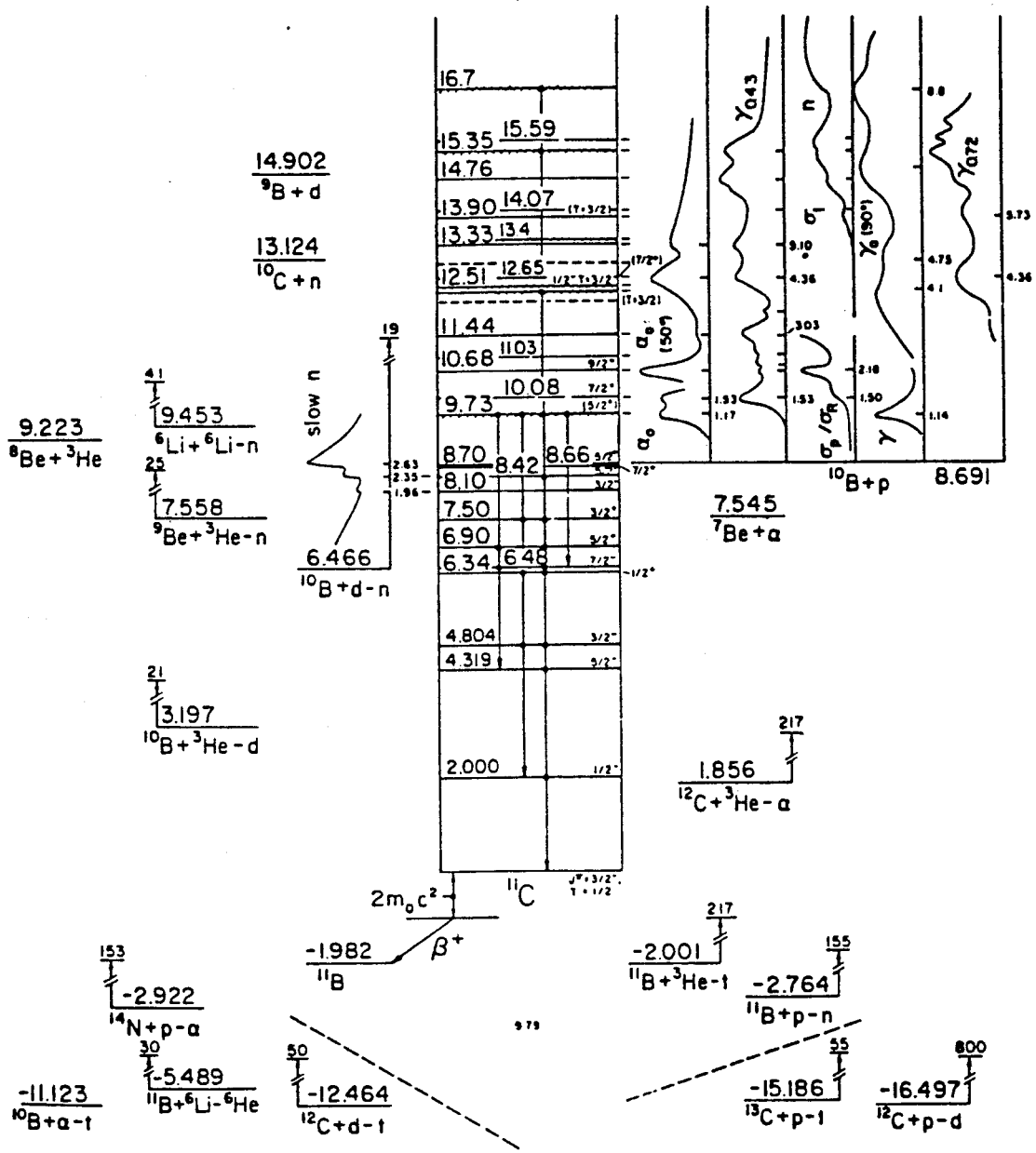
FIG. 11 is designated Table A and is a reproduction of page 33 from an article entitled "Energy Levels of Light Nuclei A=11-12" by Ajenberg-Selove beginning on page 1 and appearing in the publication *Nuclear Physics A*, 490, 1988 No. 1.
Figure 12:
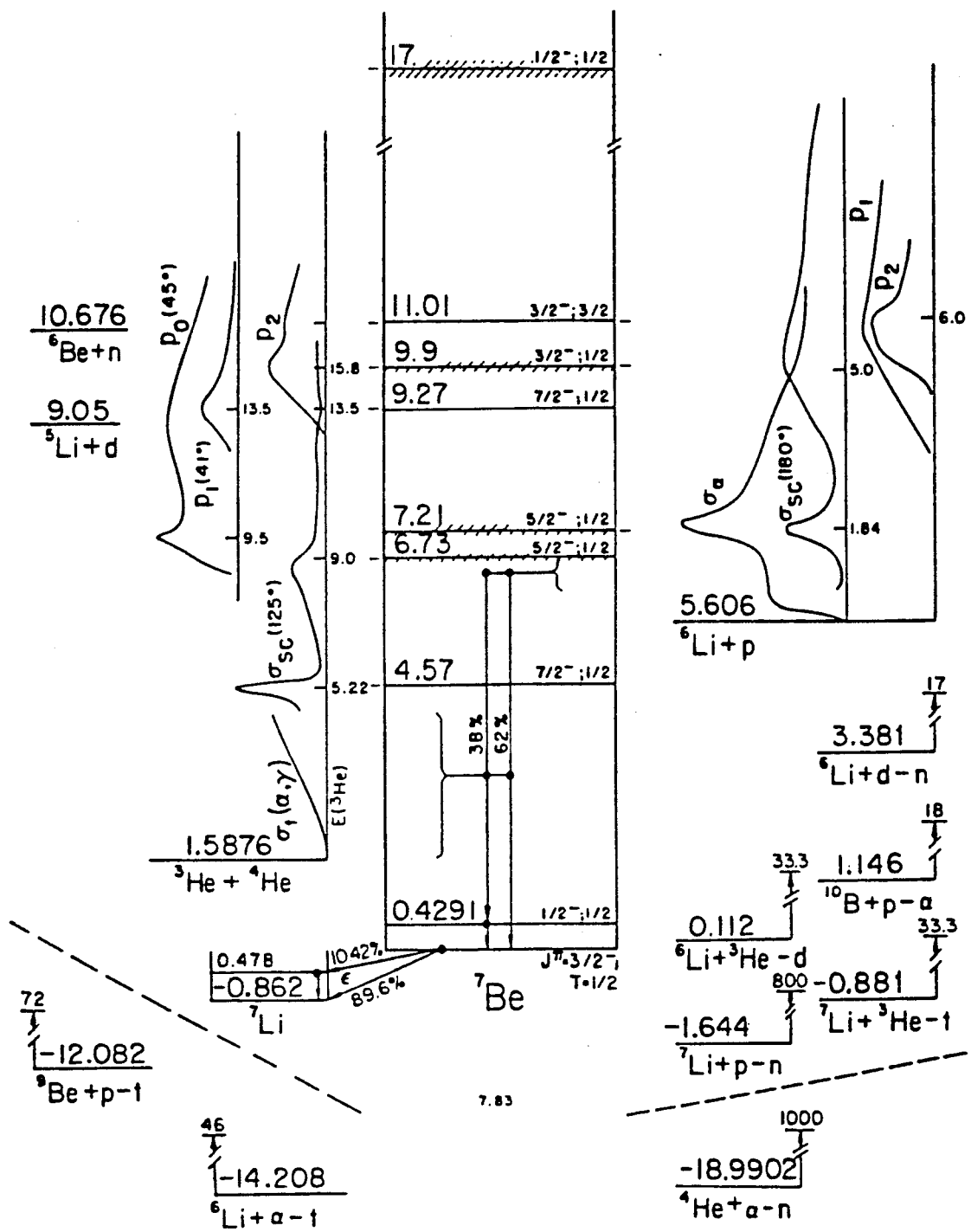

FIG. 12 is designated Table B ad is a reproduction of page 66 from an article entitled "Energy Level of Light Nuclei A=1,10" by Ajzenberg-Selove and C. L. Bush beginning on page 1 and appearing in publication *Nuclear Physics A*, 336, 1980 No. 1.

DESCRIPTION OF THE PREFERRED EMBODIMENT

Physical Principles

In order to detect concealed bombs in aircraft luggage, or elsewhere, it is necessary to determine a "signature" that an explosive is present. Two approaches appear to be fruitful, the analysis of the air inside the suitcase for nitrotoluenes, either by a mass spectrometer or a trained dog, or the detection of nitrates within the suitcase. Unless the suitcase is subject to reduced pressure capable of exploding bags, (and therefore causing difficulties with harmless aerosol cans) then "bagging" explosives in a sealed plastic bag will be sufficient to disable the chemical analysis technique. Incidentally, a suitcase full of old fashioned gunpowder would escape this form of chemical detection.

Looking for nitrates within a suitcase implies using a penetrating probe which is element (or preferably compound) selective. Excitation of the contents of the suitcase by X-rays and observing the characteristic emission of nitrogen and oxygen atoms is not feasible as the very low energy (less than 1 Kev) X-rays that these elements would emit will be so heavily absorbed by the suitcase material that their detection on the outside would be impracticable. The other practical penetrating probe are neutrons. Neutrons do not interact with anything except nuclear matter, consequently they can only be used to probe the nuclear properties of elements. Fortunately, both oxygen and nitrogen have nuclear "signatures" which enable their presence to be detected.

Detecting nitrates in a suitcase is a screening tool, suspicious suitcases would then need to be opened to visually examine suspicious areas. For example, the plastic "melamine", a common material for unbreakable tableware has an almost identical nitrate concentration to TNT. It is of course, not essential that nitrates be present in all explosives, for example perchlorates, containing oxygen and no nitrogen, or azides containing nitrogen and no oxygen both form explosive materials. However, such materials are not in commercial production in large quantities, and thus to first order would not be a threat in luggage. (Azides are the percussion trigger in cartridges).

The technique of this patent application is to pass a beam of neutrons of a known intensity into a suitcase and measure the intensity of neutron beam exiting from the remote side. What is being measured is the inclusive absorption of neutrons by all nuclear processes by the material inside the suitcase. This includes situations where atomic nuclei in the material of the suitcase contents scatter incoming neutrons in directions differing from that of the incoming beam, and situations in which the nuclei absorb the neutron and become transmuted into a different isotope. As can be seen from the two NBS charts (Charts 1 & 2) for the absorption of a beam of neutrons under the conditions described above, the absorption probability depends in a complex manner on the energy of the incident neutrons, for example, at an incident neutron energy of 2.35 Mev the absorption of oxygen falls to one tenth of the absorption at 2.00 Mev. NBS (National Bureau of Standards) Chart 1 is the resonant absorption spectrum for oxygen. NBS Chart 2 is the resonant absorption spectrum for nitrogen; NBS Chart 3 is the resonant absorption spectrum for carbon; and NBS Chart 4 is the resonant absorption spectrum for hydrogen (note that the hydrogen resonant absorption spectrum is featureless). Charts 1 to 4 are reproductions of pages from NBS Monograph 138, Nuclear Science Division, National Bureau of Standards, Washington D.C., by A. B. Schwartz, R. H. Schrack, and Thompson Heaton II.

The Requirements of an Absorption Measurement

In order to produce a workable device, as distinct from a theoretical concept, operating limits need to be established. The easiest is the minimum mass of explosive to be detected, for this patent application it will be set at 125 gms (¼ lb). This is a factor of four less than the estimated amount of explosive used on the Pan Am flight that terminated at Lockerbie Scotland. Much more difficult is to determine the shape of the explosive. If it is to be concealed in some object, for example a radio, fax machine, electric razor, etc., then it will be compact and will approximate a ball. Such a 125 gram ball would have a diameter of 2.06". However, if it is to be concealed in the lining of the suitcase it will be of the form of a thin sheet. In the first case, adequate spatial resolution is needed, as a small ball located for example in one corner will make little difference to the overall absorption of neutrons. In the second case, a thin sheet will have only a small effect on the intensity of the transmitted neutron beam, hence the intensity will need careful measurement. The parameters set are to divide a 30"×20" suitcase into 2"×2" measurement areas, and set the detection limit as a ¼" thick sheet of TNT or equivalent.

The final parameter is the measurement time. If all suitcases are to be screened before loading onto an aircraft, then the measurement time per suitcase is critical. A throughput of 1000 suitcases per hour (i.e. ¾ hour to screen a single fully loaded 747) is the minimum acceptable per measuring station.

Assume that a reasonable compromise between cost and efficiency is to use a 5×5 array of 2" scintillation detectors to measure the neutrons, then 6 measurement areas would be needed to scan a 20"×30" suitcase, i.e. a measurement time of 0.6 seconds per 5×5 cell area.

Assume that the 2.35 Mev oxygen absorption change is being measured and that the average absorption change is from one barn to 0.5 barn. (At the exact resonance it is 0.1 barn, but all incident neutrons will not be at exactly the resonant energy).

TNT ($NO^2$) $3C_6H_2CH_3$ has six oxygen atoms/molecule and a molecular weight of 227. Hence 227 gms of TNT contain $6 \times 10^{23}$ molecules. As the density of TNT is 1.654 the 227 gms would occupy 137 ccs. A section one cm square and ¼" thick would have a volume of 0.635 ccs and therefore would contain $(1.6 \times 10^{23}) \times 0.635/137 =$ $7.4 \times 10^{20}$ TNT molecule Therefore the number of oxygen atoms per sq cm is:

$4.4 \times 10^{21}$ atoms

As one barn represents an absorption area of $1 \times 10^{-24}$ sq cm the change in opacity for a 0.5 barn change in absorption is:

$2.2 \times 10^{-3}$

This means that it is necessary to measure a change of 0.22% in absorption. (In CAT scanning terms 22 Houndsfield units). This however determines the number of neutrons which must be detected in each 2"×2" cell in the 0.6 seconds calculated above. As the neutrons are a random phenomenon, then if N neutrons are detected the R.M.S deviation will be the square root of $N(N^{0.5})$ For this case:

$(N^{0.5})/(N) = 2.2 \times 10^{-3}$

N=206000 counts in 0.6 seconds, or a flux of $3.5 \times 10^5$ neutrons per second passing through the 2"×2" cell. This however makes no account of the efficiency of the detector which is approximately 5%. Hence the total flux of neutrons/second per cell including detector efficiency is:

$N = 6 \times 10^6$ neutrons/second

Comparison With Scattering Measurements

If a change of absorption of $2.2 \times 10^{-3}$ takes place due to the presence of a ¼" layer of TNT in the suitcase, then at the best case all the neutrons absorbed from the incident beam will be rescattered into all directions. If a detector completely surrounding the suitcase could be fabricated, then the flux of scattered neutrons entering it will be:

$(3 \times 10^5) \times (2.2 \times 10^{-3}) = 660$ neutrons/sec

Which with the same 5% detection efficiency will result in a detected rate of 33 neutrons/sec. In general, and certainly in previous patent drawings (U.S. Pat. No. 4,864,142), the scattered detectors occupied about 1% of the available solid angle, (Total space around the suitcase). This would imply that for the same incident flux, the detection rate would be 0.33 neutrons/sec. Obviously in order to obtain any worthwhile statistical accuracy either a larger flux of neutrons, or a larger counting time would be needed to utilize scattered neutrons.

Production of Neutrons

The above calculations presupposes a given neutron influx, in the order of $6 \times 10^6$ neutrons/second through the 2" cell for absorption measurement, and probably at least a factor of 100 greater for the scattering measurement.

The accepted method of production of monoenergetic neutrons is by using a charge exchange nuclear reaction. Charged particles, usually protons though alpha particles are also employed, are allowed to strike a foil of a low atomic number element. The protons impinge on the nuclei of this target and cause nuclear reaction resulting in the emission of neutrons. The desirable reactions are two body reactions, in which initially there is a target nucleus atomic number Z and a proton, and after reaction there is a target nucleus atomic number Z+1 and a neutron. In this case the energy of the neutron is directly related by a known offset (called the Q value) to the incident energy of the proton.

Less desirable are reactions such as between lithium-7 target and a proton beam in which the daughter nucleus has an excited state which can also be excited. In this case, for a single energy of incident proton on a lithium target, neutrons of two different energies will be emitted, corresponding to leaving the target nucleus in the ground state or in the excited state. Even less desirable are three body reactions, as in this case the energy of the incident proton shares statistically with the reaction products producing neutrons with a continuum of energies. This occurs when a proton beam is incident on lithium-7 as the daughter nucleus beryllim-7 breaks up into alpha plus helium-3. See Tables A and B pages 45 & 46, for a comparison of the reactions between a lithium-7 target and a proton beam, on the one hand, and the reactions between a boron-11 target and a proton beam, on the other hand. Table B is a reproduction of page 66 from an article entitled "Energy Level of Light Nuclei A=5,10" by Ajzenberg-Selove and C. L. Bush beginning on page one and appearing in publication *Nuclear Physics* A336, 1980 No. 1. Table A is a reproduction of page 33 from an article entitled "Energy Levels of Light Nuclei A=11-12" by Ajzenberg-Selove beginning on page one and the publication *Nuclear Physics* A490, 1988 No. 1.

Neutron of the incorrect energy, or with a continuum of energies produce no useful information in the absorption detector, but provide background statistical fluctuations which reduce the detection sensitivity. Of course, all nuclei, except hydrogen, have excited levels, however, by careful choice of target material, either the energy level is above the energy of the neutrons needed, or is so close that the neutrons from the excited level have insufficient energy for detection.

In theory, neutrons of a single energy could be incident on a target of zero thickness, producing neutrons of a single energy when viewed in a single direction. However, the flux would be zero. In reality, there are three effects which cause the energies of the generated neutrons to spread about the desired resonant energy. They are, (1) energy spread in the proton beam, (2) energy loss of the protons before interacting as they pass through target material of finite thickness, and (3) kinematic variation of energy with angle of the emitted neutrons due to momentum conservation between the incoming conditions in which the target nucleus was at rest, and outgoing conditions during which the target nucleus recoils. The first effect, with electrostatic accelerators is negligible as the energy spread of the proton beam is much less than the width of the resonances we are using for explosive detection.

The second effect is closely related to yield, i.e. the number of neutrons generated per second by a given intensity of the incident proton beam, as it is a function of target thickness. For most light elements the probability of neutrons generation is of the order of 0.1 barns. This means that each nucleus can be considered as having an area of $1 \times 10^{-25}$ sq cm. Unfortuantely, as the protons pass through the target, they collide with the orbital electrons of the atoms, slowly losing energy as electrons recoil. This is described by Bethe-Bloch formula which simplifies to:

$$dE/dX = MZ^2 2/E$$

For a proton M=1 and Z=1 so that $dE/dX = 1/E$. This means that the greater the energy of the proton, the slower the rate of energy loss and therefore the thicker the target that can be traversed for a given energy spread in neutron energy. This implies that the target material should have a large negative Q value, so that high energy protons will generate low energy neutrons, as then a thicker target can be used without excessive energy spread.

The kinematics requirement determines how many of the neutrons generated can be used to interrogate the suitcase. For example, if a cone of 57 degrees full angle (i.e. one steradian) could be used the $\frac{1}{4}\pi$ or about 8% of the generated neutrons could be usefully employed.

The limits are set by a fundamental physical property, the width in energy of the resonance in the neutron spectrum which is to be studied. For each resonance in nitrogen, oxygen or any other element this width is different. Neutrons at exactly the resonance energy will show the whole effect of the resonance, whereas neutrons outside the energies corresponding to the width of the resonance will show no effect and will thus be background "nuisance" neutrons. It is usual in nuclear physics to specify resonances as full width half max, meaning at what range of energies from side to side does the resonance decrease to one half of its maximum value. For the oxygen resonance at 2.35 Mev the full width, half max is 165 Kev.

As the beam, target thickness and kinematic energy spreads are not correlated they add quadratically, hence:

*Neutron energy spread = Sq root [(beam spread)$^2$ + (target spread)$^2$ + (Kinematics)$^2$]*

For the oxygen resonance, this should equal approximately 165 Kev. Note that the beam spread is usually negligible, and it is design which shares the spread between the other two sources.

Calculation of Neutron Fluxes for the Oxygen Resonance (The use of a Boron-11 target is assumed)

Kinematics

A computer routine written by M. Outhoudt at the Los Alamos laboratory calculates the knematics as shown on tables C and D on pgs 47 & 48. Table C embodies the kinematics of oxygen resonance, and table D embodies the kinematics of nitrogen resonance. As the highest energy neutrons will occur at 0 degrees, that is when the neutron leaves along the same line as the incident proton, this has been set to 2.35 Mev + 66 Kev i.e. almost the half width of the resonance above the resonant energy. Table C unfortunately ends short at 15 degrees and an energy of 2.393 Mev. Appealing to the Table D for the nitrogen resonance at 1.85 Mev, it is seen that the loss of energy is 3 Kev/degree to 23 degrees, 4 Kev/degree to 29 degrees and then 5 Kev/degree to 37 degrees. This implies that the center of resonance energy of 2.35 Mev will be reached at an angle of 28 degrees between the neutron exit direction and the proton incident direction. This implies a full cone angle of 56 degrees, and therefore that 2.4% of the generated neutrons can form the neutron beam interrogating the suitcase. (In reality this is a low estimate as the neutrons are concentrated in the forward direction). From this calculation it is determined that the required neutron flux is:

$N\ total = 6 \times 10^6/0.024$ $N\ total = 2.5 \times 10^8$ *neutrons/second*

Target Thickness and Neutron Yield

Note that above the value of neutron emission angle has been calculated which will reduce the neutron energy from the half maximum energy on the high energy side of the resonance to the center of the resonance. It is now necessary to calculate the thickness of target which will cause a spread of energy from the target center to the half maximum position on the low side of the resonance.

Using a form of the Bethe Bloch formula which is applicable over the very restricted energy loss in the target:

$$E.dE/276 = dM$$

Where E is the proton energy, (5.230 Mev from the Kinematics table), dE is the energy loss from front to back of target, 66 Kev, i.e. $66 \times 10^{-3}$ Mev, and dM is the area density in gms/sq cm.

*Hence* $dM = 1.25 \times 10^{-3}$ *fm/sq cm*

For boron-11, 11 grams will contain $6 \times 10^{23}$ boron atoms. This target will therefore contain:

$(6 \times 10^{23}) \times (1.25 \times 10^{-3})/11 = 6.8 \times 10^{19}$ *atoms/sq cm*

If, as stated above, the neutron generation probability is represented by an area of 0.1 barn, $\times 10^{-25}$ sq cm, then the total neutron generation area of this target is:

$(6.8 \times 10^{19}) \times (1 \times 10^{-25}) = 6.8 \times 10^{-6}$ *sq cm/sq cm*

This means that for each sq cm of the target, $6.8 \times 10^{-6}$ sq cm will be active in generating neutrons.

Hence the proton flux needed will be the neutron flux/neutron generation efficiency or $(2.5 \times 10^8)/(6.8 \times 10^{-6}) = 3.7 \times 10^{13}$ *protons/sec*

As each proton carries a single electron charge of $1.6 \times 10^{-19}$ coulombs then the flow of charge of the proton beam is:

$(3.7 \times 10^{13}) \times (1.6 \times 10^{-19}) = 5.86$ *microamps*

This is well within the capability of a tandem van de Graaff accelerator, which would need a maximum terminal potential of less than 2.7 Mev. (For this measurement 2.615 Mev. (5.23 Mev/2)

Energy Control and Stability

As stated in a previous section the detection of a ¼" thick layer of TNT would require the measurement of a fractional absorption change of $2.2 \times 10^{-3}$ (0.22%). The intensity stability of a tandem accelerator beam is about 10%, thus a direct measurement is not possible. Fortunately the intensity changes occur slowly over a period of seconds, hence the method of measurement to be adopted is to change the energy of the neutron beam from on resonance at the 2.35 Mev center, to off resonance at 2.5 Mev. The change in absorption between the 2.5 Mev and 2.35 Mev neutrons will then determine the oxygen concentration. (Note from the NBS graphs (Charts 2 and 3) there are no significant changes in the absorption of carbon and of nitrogen between these two energies. (Hydrogen has no structure at any energy)

As the measurement time is 0.6 seconds per 25 cell view, the neutron energy needs to be changed up and down about ten times during the measurement or about every 0.06 seconds. The energy of the accelerator cannot be changed at this rate, so alternative procedures will need to be found. Two methods are practicable, one mechanical, one electrical. The mechanical method is to set the machine permanently to generate neutrons at the 2.5 Mev energy. A vibrating arm, vibrating 10 times in 0.6 seconds, i.e. a frequency of 16.7 Hz carries at its end a thin foil. When this foil is out of the path of the proton beam the full energy beam hits the Boron-11 target and produces neutrons of average energy of 2.5 Mev. When the foil is interposed between the foil and the target, the proton beam loses 150 Kev of energy traversing it, and thus the neutrons are produced with an average energy of 2.35 Mev. Equally well a rotating wheel with open and foil covered windows could be used to achieve the same effect.

The other method is to install a switchable power supply within the terminal of the accelerator, and provide a small amount of additional acceleration. This power supply can then be turned on or off electrically to provide or eliminate the added acceleration. As altering the effective terminal potential of a tandem van de Graaff makes double the difference in the energy of the proton beam then a 75 KV supply would be sufficient to change the neutron energy by 150 Kev. This method has the advantage of no moving parts, and no interference with the proton beam. Note that in both cases, the beam will be measuring on and off resonance. This is still well within the accelerator capabilities.

The energy stability of a tandem van de Graaff of this size is of the order of 1 Kev, and thus is adequate for the measurements without additional precautions.

Targets

The above analysis has used a proton beam on a boron-11 target. Others have suggested the use of lithium-7 for neutron generation. This choice (boron-11) is deliberate for several reasons. One, the reaction with boron-11 is more endothermic, so that higher energy protons are needed to produce neutrons of the desired energy. From above, the rate of loss of energy passing through the target, and hence the energy spread of the outgoing neutrons varies with the inverse of the energy (1/E). This means that the protons can traverse a more massive boron target relative to lithium for the same energy spread. This in turn means that the proton has a larger probability of interacting, and thus more neutrons/sec will be produced by the same intensity proton beam. This is important as the time of measurement is linearly dependent on the neutron beam intensity.

Boron-11 is more massive than lithium-7 naturally, by a ratio 11/7. This is important as the kinematic change of energy of the outgoing neutron depends on the ratio of the neutron mass (1) to the daughter mass (11 versus 7). This means that a much bigger fraction of the total neutrons produced (i.e. solid angle) can be utilized. The flux will be approximately $(11/7)^2 = 2.46$ times larger for boron than for lithium, thus increasing the number of useful neutrons per second for the same proton beam intensity.

In addition, boron is a hard high melting point stable metal which can be formed into a self supporting target foil of 95% or better boron-11. Lithium on the other hand is a low melting point alkali metal which is not stable in moist air and cannot be used to form an elemental self supporting target. Therefore a compound target must be used such as lithium sulfide which implies that the actual lithium-7 content of the target is limited to 66%, again reducing the number of available neutrons for the same intensity proton beam.

The above details in a sense are the external details associated with the use of boron-11 in preference to lithium-7 as a target material. From the nuclear physics viewpoint, there are also several advantages. The production probability (cross section) for neutrons from different light odd atomic weight (A) targets are all similar, around 0.1 barns. (Neutron production probabilities for even A targets are smaller as the neutrons are paired). However, beryllium-7, the daughter of lithium-7, has an excited state at just less than 0.5 Mev above the ground state. This implies that for proton bombardment energies producing neutrons with energies greater than 0.5 Mev, two groups of neutrons will be produced, differing in energy by the energy of the excited state. Only one group will be resonant with the absorption features of oxygen or nitrogen being measured, the other will provide an unwanted background, diluting the change in absorption ratio on and off resonance. The first excited level of boron on the other hand is at 2.0 Mev, so that neutrons produced below this energy will be free of contamination by neutrons of lower energy produced from an excited final state nucleus (see Table A). Even more important is the breakup of the daughter nucleus. For proton bombardment, energies greater than 1.59 Mev, the daughter beryllium-7 breaks up into helium-4+helium-3. This breakup is a three body reaction, which therefore produces neutrons with a continuum of energy from zero upwards. This neutron continuum also dilutes the absorption ratio and makes it necessary to obtain better counting statistics in order to detect the target quantity of explosives. Carbon-11, the daughter nucleus formed in the boron-11 reaction does not break up until neutron energies greater than 3 Mev have been attained (see Table A). This is above the range of energies to be employed in this operation, thus there will be no neutrons formed with a continuum of energies by this reaction.

Detectors

The detectors used will have to deal with a very large flux of incoming neutrons. Today the only suitable detector is the scintillator/photomultiplier. In this detector, a scintillating liquid, (usually Nuclear Enterprises NE 213, generically the chemical stilbene) is coupled to a photomultiplier. Collisions between the incoming neutrons and hydrogen nuclei in the scintillator transfer energy from the neutrons to the "knock-on" protons. As these protons are charged, they interact with the electrons of the molecules on their recoil path through the scintillator, producing excitation. The molecules quickly revert to their ground states emitting optical photons (light). The light is collected and turned into a pulse of electrical charge by the photomultiplier.

This detector can be operated in two modes, the count mode, or the current mode. In the count mode, each individual neutron is counted as a separate pulse of charge. This produces high accuracy, but is limited by the maximum counting rate of the associated electronics. In the current mode, the total charge produced by the photomultiplier is measured as being a measure of the total number of neutrons detected (i.e. an integral measurement). It is intended to operate this detection system in current mode, with the option of reverting to counting mode should increased accuracy be required. Operation in counting mode, using this particular scintillator enables neutron events which produce recoil protons to be distinguished from gamma ray events which produce recoil electrons. This is not expected to be required in the proposed operation as shielding by a layer of high atomic number material (lead) interposed between the boron target and the suitcase is expected to attenuate the gamma ray flux to negligible proportions relative to the neutron flux.

It is however intended to hold in reserve the ability to perform neutron gamma ray separation if it should be useful in increasing the sensitivity of the measurement of thin layers of explosive by reducing the non resonant component of the background.

The Actual Measurement

All the above explanation has been been directed at measuring the reduction of the neutron absorption by oxygen at 2.35 Mev neutron energy. This was chosen as this resonance is broad, allowing a considerable total spread of neutron energy, and therefore easing the requirements of the production of a sufficient neutron intensity, and is also deep resonance ranging over a factor of ten in absorption between on and off resonance (see Chart 1). It should not therefore be construed that this is necessarily the only oxygen feature of interest. Any oxygen feature which occurs at energies which are featureless in carbon, nitrogen and hydrogen (which is completely featureless) are candidates for the detection of oxygen. Likewise any absorption feature of nitrogen which occurs in a featureless region of the oxygen, carbon and hydrogen spectra is a candidate for measurement.

Currently it is intended to initially measure the oxygen content over a 25 cell array of the suitcase (total area $10''\times10''$), and then proceed to a nitrogen measurement if the detected oxygen level in any cell so warrants. To do this, an energy reducing foil mounted on a holder attached to either an electromagnet or a pneumatic cylinder (bellows between the cylinder and the foil provide a vacuum seal) will be activated placing the foil in the path of the proton beam. This will reduce the beam energy so that neutrons will be generated of correct energy for interrogating the 1.82 Mev nitrogen absorption maximum.

This method of energy change is adopted because it can be changed much faster than by altering the accelerator parameters (changeover time 20 milliseconds). It is not without problems because the loss of energy of the protons passing through the foil is a statistical process caused by collisions with the orbital electrons. If the foil is made from a thin silicon wafer, then each collision will remove 3.5 electron volts (ev of proton energy). As the energy is to be removed is:

$$2.35-1.82=0.53\ Mev$$

The number of collisions needed will be:

$$0.53\times10^6=151000$$

The R.M.S. variation in this number will be $$(151000)^{\frac{1}{2}}='-389$$

As each collision causes an energy change of 3.5 ev the energy of the emerging beam will have an additional energy spread of:

$$+-389\times3.5=2.7\ Kev$$

For the resonance in question, this additional spread will not be of consequence.

NOTE: In calculating the yield of neutrons for interrogating the 2.35 Mev oxygen resonance, the energy spread of the neutrons, kinematic+target thickness was chosen to be 120 Kev, though the resonance was 153 Kev wide at the full width half maximum point. The reason for adopting these figures was that the same boron-11 target could then be used for the 1.82 Mev nitrogen resonance except that in this case the total energy spread kinematic+target thickness+additional beam spread from the energy reduction foil would make the neutron energy profile match the width of the nitrogen resonance (see Charts 1 and 2). This is a point of convenience, if it was not possible, then two foils of different thickness would be mounted in two adjacent holes in a ladder target holder and a second electromagnet or pneumatic cylinder used to place either the thicker or the thinner foil in the proton beam as needed. If two foils of boron were used, then the energy reducing foil would be mounted on the same frame so that only one movement will be needed (see FIG. 6). It would however be very cumbersome to change the kinematics by changing the solid angle of neutrons used for the neutron beam as this would imply physically repositioning the suitcase and detectors relative to the accelerator and boron target.

Further Development

It would be much more convenient to use the nitrogen resonance at 1.8 Mev and the oxygen resonance at 1.9 Mev. These are close enough in energy to allow a "trimming" power supply in the accelerator terminal to vary the beam energy without any mechanical movements. (The on-off resonance vibrating foil is of course retained to provide a differential measurement). There is also no need to only measure nitrogen when an oxygen excess is present, if the neutron beam intensity is doubled, then the measurement time for each cell array would be halved, and both nitrogen and oxygen could be determined within 0.6 seconds. This would need twice the proton beam intensity, however, an emergent beam of 20 microamperes is easily obtainable (this was the specified current of the MP tandem produced by the High Voltage Engineering Co. in 1965, and since then improvements have been made). The data rate produced in the scintillators is however at the limit for counting techniques and current measurement (with no gamma ray rejection) will probably need to be employed. This is an area which will need an experimental study to determine feasability.

A further proton intensity increase would enable the solid angle of the neutron beam to be reduced, thus making it possible to work at 90 degrees to the direction of the incident protons (at 90 degrees the nuclear yield is lower and the kinematic energy change with angle is larger). The advantage of 90 degree operation is that several measurement stations for example 4–6, could be grouped around a single a accelerator thus both increasing the throughput 4–6 times and hence reducing the overhead cost per suitcase scanned.

Display

This is not a primary part of the patent application, however, it is intended to simultaneously X-ray the suitcase with high resolution. This X-ray image would provide the luminance (brightness) signal for a standard tricolor video display, while the oxygen and nitrogen contents would be displayed as hue using two axes of the color triangle. The operator would therefore see a nitrate superposition as color changes over a X-ray image of the suitcase. From this a judgment can be quickly made to hand inspect or to pass the case for loading.

Residual Suitcase Radiation

This problem can best be approached by considering the upper limit of possibility. Suppose all the neutrons that impinged on the suitcase were stopped inside the case. This is obviously impracticable, as then there would not be any neutrons on the far side to measure, however it gives the upper limit on the total energy that could be deposited in the case. Calculated flux from previous sections:

$6 \times 10^6$ neutrons per second

Time to measure a $30'' \times 20''$ suitcase, 6 segments of $10'' \times 10''$ 25 element measuring array.

3.6 seconds (1000 case/hr)

Total number of neutrons impinging on case:
Worst case energy of each neutron, measuring the 2.35 Mev oxygen resonance, 50% time at 2.35 Mev, 50% at non resonant 2.55 Mev, average neutrons energy 2.45 Mev.

If all neutrons stopped in suitcase, total energy left in suitcase:

$(2.16 \times 10^7) \times (2.45 \times 10^6) = 5.3 \times 10^{13}$ electron volts Or translated to more normal units of energy:

$(5.3 \times 10^{13}) \times (1.6 \times 10^{-19}) = 8.5 \times 10^{-6}$ Joules

Suppose that all the neutron energy went into producing radioactivity, the suitcase was completely swallowed by an average 170lb (77 Kilogram) weight human, and all the radioactivity was deposited in the person's body. A remote possibility, but the suitcase could conceivably be packed with food.

Then the amount of radioactivity energy deposited per kilogram of body tissue would be:

$(8.5 \times 10^{-6})/77 = 1.1 \times 10^{-7}$ Joules/Kg

As however one Rad of radiation dose is $1 \times 10^{-2}$ Joules/Kg, the dose to the human is:

$(1.1 \times 10^{-7})/(1 \times 10^{-2}) = 1.1 \times 10^{-5}$ Rads

The radiation needs now to be assigned a biological effectiveness (RBE). It will be a mixture of gamma rays, and fast electrons (beta rays). The worst known biological effectiveness is 14, so using this to give a worst case:

Dose (rem) = rads $\times$ RBE

Dose = $(1.1 \times 10^{-5}) \times 14 = 1.54 \times 10^{-4}$ rem

The normal background on earth provides an average dose to all humans of 70 millirem per year, (rising at high altitude such as Boulder, Colorado to greater than 300 millirem per year).

Hence for the traveller to ingest radioactivity at the absolute worst case in order to double the exposure to twice the natural background he or she would need to consume:

70/0.15 = 467 suitcases per year

This is beyond comprehension for even the hungriest traveller.

Corollary

What fraction of the incident neutron beam will be absorbed by a typical suitcase? The above calculation assumed 100%. However, a more realistic figure is given by assuming the thickness of the suitcase is 20 cm (8"), and the average atomic weight of the atoms of the internal materials is 12, (i.e. a mixture of carbon, oxygen, hydrogen). Assuming the suitcase has a mass of 20 Kg (44 lbs) then the density of a 30"×20"×8" suitcase is approximately (0.26 gm/cc).

As the mass of a 1 cubic centimeter of the suitcase is 0.26 gm and the average atomic mass is 12, then 12 gms of material will contain $6 \times 10^{23}$ atoms. Therefore the number of atoms in this cubic cm is given by:

$$\#atoms = (6 \times 10^{23}) \times 0.26/12 = 1.27 \times 10^{22}$$

consider now a slice thickness dx in this cube. The number of atoms in the slice would therefore be:

$$(1.27 \times 10^{22}) \times dx$$

for fast neutrons is less than 2 barns or $2 \times 10^{-24}$ sq cm then the capacity of this layer will be:

$$(1.27 \times 10^{22}) \times (2 \times 1^{-24}) \times dx = 0.025 \times dx$$

Hence the fractional difference in the number of the neutrons available (dN/N) after passing through this layer thickness dx will be given by:

$$dN/N = -0.025 \times dx$$

By integrating:

$$\log(N) = -0.025 \, x + c$$

Setting N to be equal to the number incident on the suitcase at x=0 say Ni then:

$$\log(Ni) = c$$

or substituting in the original equation:

$$\log(N) = 0.025 \, x + \log(Ni)$$

$$\log(N/Ni) = -0.025x$$

At the other side of the suitcase x=20 cm (that is the designated suitcase thickness), therefore:

$$\log(N/Ni) = -0.5$$

*Therefore N/Ni = 0.607*

Hence 60% of the neutrons will exit the far side of the suitcase, only 40% will remain in the case.

The number of suitcases (contents) ingested per year needed to possibly deliver a dose equal to background is therefore increased to:

$$467/0.4 = 1167.5 \text{ per year or } 3.2 \text{ per day.}$$

Apparatus

Referring now to the drawings and, more particularly, to FIG. 1, it will be seen that a Van de Graaff or other suitable particle accelerator, designated designated generally by the reference numeral 10, is diagrammatically shown. The accelerator 10 produces a proton beam which is accelerated through the accelerator tube 12. Although not shown in the drawing, the accelerator tube 12 is provided with electrode stacks, which are positioned within a pressure jacket. The interior of the accelerator tube defines a vacuum chamber 13 through which the proton beam is accelerated and focused.

A neutron generating target 15 is located downstream of the electrode stack, and the beam is focused at the target 15. It will be appreciated that a magnetic focusing device, or other focusing means, will be provided for focusing the proton beam at the target 15. In the embodiment shown in FIGS. 1 and 2, the target 15 comprises a rotating wheel 16 having an axle 17. The wheel 16 and axle 17 are formed of a high thermal conductive material, preferably copper or the like, which has a nuclear Z great enough for it not to be involved in nuclear reaction at the necessary proton energies. Copper satisfies the nuclear Z requirement, and the thermal conductivity of copper is sufficient to allow intense beams of protons to impinge on it without problems of heat dissipation.

The target 15 also includes a boron annulus 18 mounted on the front surface of the wheel 16. As indicated hereinabove, the thickness dimension of the boron target is an important criterion in achieving the overall optimum results. The thickness of the boron layer selected depends upon the width of the absorption spectrum of the nuclei of the element to be detected. For example, when nitrogen is to be detected, the thickness of the boron layer is preferably within the range of 7.0 to 8.0 microns. On the other hand, when oxygen is to be detected, the boron layer thickness should be within the range of 8.5 to 9.5 microns. The boron annulus 18 may be of alternate thickness (a larger thickness to measure oxygen resonance or lower thickness to measure nitrogen resonance) to permit measurement of oxygen and nitrogen absorption resonances with a single target.

A plurality of circumferentially spaced apart elements formed of energy degrading material, preferably gold (although tantalum or similar materials may be used), is applied to the front or facing surface of the boron annulus 18. These gold elements will also be of predetermined thickness, so that the energy level of the energy degraded proton will be at a resonant energy or just outside the absorption spectrum of nitrogen or oxygen nuclei depending on the setting of the Van de Graaff accelerateor. If nitrogen is to be detected, then the gold foil should be within the range of 0.8 to 12 microns. If oxygen is to be detected, thn the gold foil should be within the range of 1.1 to 1.4 microns.

Although not shown in the drawing, means are provided for rapidly rotating the wheel 16, so that the gold elements 19 periodically move across the beam and serve to degrade the energy of certain of the protons of the proton beam. In this regard, the protons of the proton beam pass through the gold foil elements 19 and lose energy by electrostatic interaction with the electrons of the foil elements. Other protons of the proton beam pass directly through the boron layer and, in the proton-neutron reaction, produce neutrons having a resonant absorption energy of nitrogen or oxygen nuclei. The energy degraded protons (those passing through the foil elements) will produce neutrons at a lower energy and are not resonantly absorbed by the nitrogen or oxygen nuclei. On the other hand, if the proton beam energy is 2.55 Mev (off resonance for oxygen nuclei), then the degraded protons will generate on resonance neutrons at 2.35 Mev. In any event, the generated neutron beam will contain on resonant neutrons at a resonant energy of the element being interrogated (oxygen or nitrogen), and off resonant neutrons outside the element being interrogated.

The generated neutron beam 20 passes through a channel 21, formed by a channel-defining structure 22, having an interior 23, which is filled with boron or cadmium loaded water. The boron or cadmium loaded water 24 absorbs unwanted neutrons or slows unwanted neutrons by knock-on reaction. It will also be noted that the axle 17 of the wheel 18 projects into the interior 23 of the channel-defining structure, whereby the water therein also serves as a cooling medium for the axle and wheel.

The generated neutron beam 20 is directed at a scintillator-photomultiplier detector arrangement located downstream of the beam. The detector system includes a vertically arranged line array of scintillators 25 and a corresponding number of photo-multipliers 26. The scintillators 25 contain a scintillating liquid, preferably a Stilbene or other proprietary compound, such as NE213, provided by Nuclear Enterprises, Inc. This type of scintillator has different properties for the time over which light is emitted when excited by a recoil proton from a neutron-proton collision and when excited by a recoil electron from a gamma ray event. These scintillator detectors are, therefore, provided with timing discrimination to assure that the events being measured are coming from incoming neutrons and are not diluted by background gamma rays. This type of scintillator detector 25 is well-known in nuclear physics, and a detailed description of its structure and operation is unnecessary for the present application.

The vertical line array of scintillators 25 and photomultipiers 26 provides a spatially resolved line in which the nitrogen and oxygen neutron absorption is measured. During the measurement operation, the container 28 to be measured is supported and moved by a conveyor 27 past the detectors along the orthogonal axis so that the total measurement provides a two-dimensional field of measurement areas.

Referring again to FIG. 1, it will be noted that the container to be investigated passes an x-ray station 29 in its orthogonal path of travel before it reaches the line array of scintillators and photo-multipliers. The X-ray station will X-ray the interior of the container 28, and the normal digital storage techniques hold the X-ray image for simultaneous display with the elemental data.

Referring now to FIGS. 3 and 4, it will be seen that a slightly different embodiment of the apparatus for carrying out the novel method is thereshown. This apparatus also includes a particle accelerator 40, preferably a Van de Graaff accelerator, having a proton generator 41 for producing mono-energetic protons. The generated proton beam 44 is directed through an accelerator tube 42, the interior of which defines the vacuum chamber 43. Again, it is pointed out that the details of construction of the Van de Graaff accelerator tube 42 are identical to that disclosed in the embodiment of FIG. 1 and the accelerator, per se, does not constitute the present invention.

The proton beam is accelerated and directed at a target 45, which includes a boron layer or film 46, mounted on a substrate 47 formed of an element, preferably copper, having a high nuclear Z.

It is again pointed out that suitable focusing means will be provided for focusing the proton beam at the target 45. The energy degrading means is provided for degrading the energy of some of the mono-energetic protons accelerated through the accelerator tube, and this energy degrading means includes an oscillating vibrator 48. The vibrator 48 includes a substantially flat plate 49 which is secured to one end of an elongate spring bar 50, the other end of the spring bar being secured to a fixed support 51. The spring bar 50 is formed of a beryllium copper and is rapidly oscillated by an electromagnetic switch or solenoid 52.

The electromagnetic switch 52 includes an armature affixed to the spring bar 50 intermediate the ends of the latter, as best seen in FIG. 4. The electromagnetic switch also includes a bar 54 having a coil 55 positioned there-around, the coil being connected to a suitable source of alternating electrical current. It will be appreciated that, upon excitation, the electromagnetic switch will alternately attract and release the iron armature, thereby causing the plate 49 to oscillate across the proton beam 44.

The plate 49 is provided with an opening 56 and an opening 57 therein, the openings being of a size to permit the proton beam to pass therethrough. The opening 57 is closed by a gold foil 58 having the same thickness dimension as the thickness dimension of the foil elements 19 in the embodiment of FIG. 1. Again, it is pointed out that the thickness dimension of the boron layer or film and the thickness dimension of the foil element of the embodiment of FIGS. 3 and 4 is selected using the same criteria as that used in the selection of these characteristics in the embodiment of FIG. 1.

It will be seen that, as the vibrator is oscillated across the mono-energetic proton beam 44, the unobstructed opening 56 and the foil obstructed opening 57 will be alternately moved across the beam to thereby periodically degrade the protons of the beam in a manner similar to the rotating wheel of FIG. 1. Thus, some of the protons of the proton beam will have their energy degraded, while other protons of the proton beam will be unaffected by the vibrator.

The proton beam 44 will collide with the boron target and will produce a neutron beam containing on resonant neutrons at a resonant energy of nitrogen or oxygen nuclei and will also contain off neutrons outside a resonant energy nitrogen or oxygen nuclei. The generated neutron beam 59 will pass through a channel 60 formed by a channel defining structure 61 having an interior which is filled with boron and cadmium loaded water in the manner of the embodiment of FIG. 1. Again, it is pointed out that the boron or cadmium loaded water absorbs unwanted neutrons and slows unwanted neutrons by knock-on reaction.

The generated neutron beam 59 is directed at a scintillator-photomultiplier detector arrangement, which includes a vertically arranged line array of scintillators 63 and a corresponding vertical line array of photo-multipliers 64. A conveyor 65 supports and moves containers 66 to be investigated along the orthogonal axis in the manner of FIG. 1, so that the total measurement provides two-dimensional field of measurement areas.

It will also be seen that an X-ray station 67 is positioned upstream of the scintillator and photo-multiplier arrays in the manner of FIG. 1. The X-ray station will X-ray the interior of the container 66 to be investigated, and the X-ray image will be held by the normal digital storage techniques for simultaneous display with the elemental data upon a display screen located at the display screen station 68. The detectors will detect, measure, and compare the difference in neutrons removed and the neutrons passing through the container to thereby determine the presence of a predetermined amount of oxygen and nitrogen in the container as an indication of the presence of an explosive therein.

It is again pointed out that, once the container has passed the measurement station, nitrogen and oxygen excesses of each measurement point are displayed as color change information, superimposed on the high resolution X-ray image. In this regard, the more intense the hue of the color change elemental information, the greater the amount of nitrogen or oxygen within the container. The high resolution X-ray image allows the location and general configuration of these nitrogen or oxygen within the container. The high resolution X-ray image allows the location and general configuration of these nitrogen or oxygen excesses to be observed, and this assists the operator in determining if further investigation (opening and hand inspecting the contents of the container) is required.

Referring now to FIG. 5, it will be seen that one arrangement for investigating four containers simultaneously is thereshown, and constitutes the most efficient use of an accelerator. A proton beam 44 is generated by a proton generator 41 and is accelerated through the accelerator 40 towards the target 45. In FIG. 5, the energy degrading vibrator 48 is illustrated as the means for rapidly and periodically degrading the protons of the proton beam 44, but it is pointed out that the rotary wheel arrangement of FIGS. 1 and 2 could also be used.

The boron target 45 is illustrated as a concavo-convex film 46 of boron on a high Z backing (copper) 47, which permits neutron takeoff at 90 degrees to the proton beam 44. Therefore, a single proton beam is capable of generating four separate neutron beams 59 arranged at right angles to each other, and each beam simultaneously irradiates a container 66 to be investigated. There will, of course, be four separate line arrays of scintillator-photomultiplier detector stations, and there will also be four separate X-ray stations, and four separate screen stations. Although this is the most efficient use of the single accelerator, this simultaneous multiple measurement system does require a greater energy spread in the neutron beams and, therefore, requires greater accelerator capacity than is required for a single station arrangement.

Referring now to FIG. 6, another embodiment of a boron target assembly is thereshown and is used to generate on resonance neutrons at a resonant energy of the nuclei of oxygen and nitrogen, and to generate off resonance neutrons outside a resonant energy of the nuclei of oxygen and nitrogen. The target assembly, designated generally by the reference numeral 100, will be used in conjunction with the oscillating vibrator 48 (illustrated in FIG. 4) or an equivalent energy degrading means.

The boron target assembly 100 includes a compound boron target 101 which is comprised of a thick boron section 102 and a thin boron section 103. A pneumatic cylinder 104, connected to a source of air under pressure by conduits 106, is provided with a piston rod 105 connected to the compound boron target 101. Extension and retraction of the piston rod 105 alternately shifts the thick section 102 and thin section 103 into the path of the proton beam 14.

An angle bracket 107 is secured to the boron target 101 and is provided with an aperature therein which is obstructed by an energy degrading foil 108. The foil 108 comprises a tantalum wafer or foil and overlies the thin boron section 103 and degrades the energy of the proton beam before the beam encounters the thin boron section 103.

The thick boron section 102 will be used in interrogating oxygen and the thin boron section 103 will be used in the interrogation of nitrogen. The oscillator 48 will alternately degrade energy of the proton beam, and hence the generated neutron beam, between on resonance and off resonance (for both oxygen and nitrogen) for the element being interrogated.

Referring now to Chart 1, it will be seen that the selected on resonance energy for oxygen measure is 2.35 Mev and has a relatively wide energy width. Since the energy width of the on resonance measure for oxygen is of significant magnitude, a thicker boron target is used for the production of a larger number of on resonance neutrons. The oscillator 48, illustrated in FIG. 4, or the switchable power supply within the terminal of the accelerator, will be used to rapidly and alternately degrade the energy of the proton beam between the on resonance at 2.35 Mev and off resonance at 2.55 Mev for interrogation of oxygen nuclei.

When nitrogen nuclei are being interrogated, the pneumatic cylinder 104 will be actuated to shift the thin boron section 103 into the path of the proton beam 14. Referring now to Chart 2, it will be seen that the on resonance energy for nitrogen measurement of the nitrogen energy spectrum is 1.85 Mev. The energy width of this feature is substantially less than the energy width of the selected on resonance energy (2.35 Mev) for oxygen nuclei measure and will therefore require a thinner boron target for generating fewer on resonance neutrons at this selected energy width. The energy degrading foil 108 will further degrade the energy of the proton beam to the selected on resonance energy 1.85 Mev. The vibrating oscillator 48 or its electrical equivalent will alter the energy of the proton beam and hence the neutron beam between on resonance and off resonance energy for nitrogen measure.

Should the interrogation of the suitcase or luggage container show the presence of a predetermined level of oxygen and nitrogen (nitrates), the suitcase will be opened and hand inspected. The operator will see a nitrate superpositioned (suspicious predetermined mass) over a X-ray image of the suitcase. By this technique, an operator may readily determine which suitcases are to be hand inspected or alternatively to be passed on for loading.

TABLE C

KINEMATICS OF OXYGEN RESONANCE
11B(P,N)11C
11.006562( 1.007277, 1.008665) 11.008142   QA= 1.   QC= 0.
QGND= -2.765+- 0.001 MEV
TA= 5.230 MEV  PA= 99.206 MEV/C   BETAA= 0.105   1/VA= 31.724 NS/M
T IN CM= 4.790 MEV   S= 125.344 GEV**2
EX= 0.000 MEV   RXN THRESHOLD= 3.018 MEV

| THLC DEG | THCMC DEG | TLC MEV | PC MEV/C | BRHOC KGCM | BETA | 1/VC NS/M | JAC | DTC/DTH KEV/DEG | THLD DEG | TLD MEV |
|---|---|---|---|---|---|---|---|---|---|---|
| 0.00 | 0.00 | 2.416 | 67.423 | 0.0 | 0.072 | 46.603 | 0.768 | 0 | 0.00 | 0.04 |
| 0.50 | 0.57 | 2.416 | 67.423 | 0.0 | 0.072 | 46.603 | 0.768 | 0 | −1.06 | 0.04 |

TABLE C-continued

KINEMATICS OF OXYGEN RESONANCE
11B(P,N)11C
11.006562( 1.007277, 1.008665) 11.008142  QA= 1.  QC= 0.
QGND= -2.765+- 0.001 MEV
TA= 5.230 MEV  PA= 99.206 MEV/C  BETAA= 0.105  1/VA= 31.724 NS/M
T IN CM= 4.790 MEV  S= 125.344 GEV**2
EX= 0.000 MEV  RXN THRESHOLD= 3.018 MEV

| THLC DEG | THCMC DEG | TLC MEV | PC MEV/C | BRHOC KGCM | BETA | 1/VC NS/M | JAC | DTC/DTH KEV/DEG | THLD DEG | TLD MEV |
|---|---|---|---|---|---|---|---|---|---|---|
| 1.00 | 1.14 | 2.416 | 67.422 | 0.0 | 0.072 | 46.604 | 0.768 | 0 | −2.12 | 0.04 |
| 1.50 | 1.71 | 2.416 | 67.420 | 0.0 | 0.072 | 46.605 | 0.768 | 0 | −3.18 | 0.04 |
| 2.00 | 2.28 | 2.416 | 67.418 | 0.0 | 0.072 | 46.607 | 0.768 | 0 | −4.23 | 0.05 |
| 2.50 | 2.85 | 2.415 | 67.414 | 0.0 | 0.072 | 46.609 | 0.768 | 0 | −5.27 | 0.05 |
| 3.00 | 3.42 | 2.415 | 67.410 | 0.0 | 0.072 | 46.612 | 0.768 | 0 | −6.31 | 0.05 |
| 3.50 | 3.99 | 2.415 | 67.406 | 0.0 | 0.072 | 46.615 | 0.768 | 0 | −7.34 | 0.05 |
| 4.00 | 4.56 | 2.414 | 67.400 | 0.0 | 0.072 | 46.619 | 0.768 | 0 | −8.37 | 0.05 |
| 4.50 | 5.13 | 2.414 | 67.394 | 0.0 | 0.072 | 46.623 | 0.768 | 0 | −9.38 | 0.05 |
| 5.00 | 5.71 | 2.413 | 67.387 | 0.0 | 0.072 | 46.628 | 0.769 | −1 | −10.38 | 0.05 |
| 5.50 | 6.28 | 2.413 | 67.380 | 0.0 | 0.072 | 46.633 | 0.769 | −1 | −11.36 | 0.05 |
| 6.00 | 6.85 | 2.412 | 67.371 | 0.0 | 0.072 | 46.639 | 0.769 | −1 | −12.34 | 0.05 |
| 6.50 | 7.42 | 2.412 | 67.362 | 0.0 | 0.072 | 46.645 | 0.769 | −1 | −13.29 | 0.05 |
| 7.00 | 7.99 | 2.411 | 67.352 | 0.0 | 0.072 | 46.652 | 0.769 | −1 | −14.24 | 0.05 |
| 7.50 | 8.56 | 2.410 | 67.342 | 0.0 | 0.071 | 46.659 | 0.770 | −1 | −15.16 | 0.05 |
| 8.00 | 9.13 | 2.409 | 67.331 | 0.0 | 0.071 | 46.667 | 0.770 | −1 | −16.07 | 0.05 |
| 8.50 | 9.70 | 2.409 | 67.319 | 0.0 | 0.071 | 46.675 | 0.770 | −1 | −16.96 | 0.05 |
| 9.00 | 10.27 | 2.408 | 67.306 | 0.0 | 0.071 | 46.684 | 0.770 | −1 | −17.83 | 0.05 |
| 9.50 | 10.84 | 2.407 | 67.293 | 0.0 | 0.071 | 46.693 | 0.771 | −1 | −18.69 | 0.05 |
| 10.00 | 11.41 | 2.406 | 67.279 | 0.0 | 0.071 | 46.703 | 0.771 | −2 | −19.52 | 0.06 |
| 10.50 | 11.97 | 2.405 | 67.264 | 0.0 | 0.071 | 46.713 | 0.771 | −2 | −20.34 | 0.06 |
| 11.00 | 12.54 | 2.404 | 67.249 | 0.0 | 0.071 | 46.724 | 0.772 | −2 | −21.14 | 0.06 |
| 11.50 | 13.11 | 2.402 | 67.232 | 0.0 | 0.071 | 46.735 | 0.772 | −2 | −21.91 | 0.06 |
| 12.00 | 13.68 | 2.401 | 67.216 | 0.0 | 0.071 | 46.746 | 0.772 | −2 | −22.67 | 0.06 |
| 12.50 | 14.25 | 2.400 | 67.198 | 0.0 | 0.071 | 46.759 | 0.773 | −2 | −23.41 | 0.06 |
| 13.00 | 14.82 | 2.399 | 67.180 | 0.0 | 0.071 | 46.771 | 0.773 | −2 | −24.12 | 0.06 |
| 13.50 | 15.39 | 2.397 | 67.161 | 0.0 | 0.071 | 46.784 | 0.773 | −2 | −24.82 | 0.06 |
| 14.00 | 15.96 | 2.396 | 67.141 | 0.0 | 0.071 | 46.798 | 0.774 | −2 | −25.50 | 0.06 |
| 14.50 | 16.53 | 2.394 | 67.121 | 0.0 | 0.071 | 46.812 | 0.774 | −2 | −26.15 | 0.07 |
| 15.00 | 17.09 | 2.393 | 67.100 | 0.0 | 0.071 | 46.827 | 0.775 | −3 | −26.79 | 0.07 |

TABLE D

KINEMATICS OF NITROGEN RESONANCE
11B(P,N)11C
11.006562( 1.007277, 1.008665) 11.008142  QA= 1.  QC= 0.
QGND= -2.765+- 0.001 MEV
TA= 4.800 MEV  PA= 95.029 MEV/C  BETAA= 0.101  1/VA= 33.103 NS/M
T IN CM= 4.397 MEV  S= 125.335 GEV**2
EX= 0.000 MEV  RXN THRESHOLD= 3.018 MEV

| THLC DEG | THCMC DEG | TLC MEV | PC MEV/C | BRHOC KGCM | BETA | 1/VC NS/M | JAC | DTC/DTH KEV/DEG | THLD DEG | TLD MEV |
|---|---|---|---|---|---|---|---|---|---|---|
| 0.00 | 0.00 | 1.979 | 61.012 | 0.0 | 0.065 | 51.476 | 0.755 | 0 | 0.00 | 0.05 |
| 1.00 | 1.15 | 1.979 | 61.011 | 0.0 | 0.065 | 51.477 | 0.755 | 0 | −1.79 | 0.05 |
| 2.00 | 2.30 | 1.979 | 61.007 | 0.0 | 0.065 | 51.481 | 0.755 | 0 | −3.58 | 0.05 |
| 3.00 | 3.45 | 1.978 | 61.000 | 0.0 | 0.065 | 51.487 | 0.756 | 0 | −5.35 | 0.05 |
| 4.00 | 4.60 | 1.977 | 60.990 | 0.0 | 0.065 | 51.495 | 0.756 | 0 | −7.09 | 0.05 |
| 5.00 | 5.75 | 1.977 | 60.977 | 0.0 | 0.065 | 51.506 | 0.756 | 0 | −8.81 | 0.05 |
| 6.00 | 6.90 | 1.976 | 60.962 | 0.0 | 0.065 | 51.519 | 0.756 | −1 | −10.49 | 0.06 |
| 7.00 | 8.05 | 1.974 | 60.944 | 0.0 | 0.065 | 51.534 | 0.757 | −1 | −12.14 | 0.06 |
| 8.00 | 9.20 | 1.973 | 60.923 | 0.0 | 0.065 | 51.551 | 0.757 | −1 | −13.73 | 0.06 |
| 9.00 | 10.35 | 1.972 | 60.899 | 0.0 | 0.065 | 51.571 | 0.758 | −1 | −15.28 | 0.06 |
| 10.00 | 11.50 | 1.970 | 60.873 | 0.0 | 0.065 | 51.594 | 0.758 | −1 | −16.77 | 0.06 |
| 11.00 | 12.65 | 1.968 | 60.843 | 0.0 | 0.065 | 51.618 | 0.759 | −1 | −18.20 | 0.06 |
| 12.00 | 13.80 | 1.966 | 60.812 | 0.0 | 0.065 | 51.645 | 0.760 | −2 | −19.58 | 0.06 |
| 13.00 | 14.94 | 1.964 | 60.777 | 0.0 | 0.065 | 51.675 | 0.761 | −2 | −20.90 | 0.07 |
| 14.00 | 16.09 | 1.961 | 60.740 | 0.0 | 0.065 | 51.706 | 0.762 | −2 | −22.15 | 0.07 |
| 15.00 | 17.24 | 1.959 | 60.700 | 0.0 | 0.064 | 51.740 | 0.762 | −2 | −23.35 | 0.07 |
| 16.00 | 18.38 | 1.956 | 60.657 | 0.0 | 0.064 | 51.777 | 0.763 | −2 | −24.48 | 0.07 |
| 17.00 | 19.53 | 1.953 | 60.612 | 0.0 | 0.064 | 51.815 | 0.765 | −3 | −25.55 | 0.08 |
| 18.00 | 20.67 | 1.950 | 60.564 | 0.0 | 0.064 | 51.856 | 0.766 | −3 | −26.57 | 0.08 |
| 19.00 | 21.81 | 1.947 | 60.513 | 0.0 | 0.064 | 51.899 | 0.767 | −3 | −27.52 | 0.08 |
| 20.00 | 22.95 | 1.943 | 60.460 | 0.0 | 0.064 | 51.945 | 0.768 | −3 | −28.42 | 0.09 |
| 21.00 | 24.10 | 1.940 | 60.404 | 0.0 | 0.064 | 51.992 | 0.769 | −3 | −29.26 | 0.09 |
| 22.00 | 25.24 | 1.936 | 60.346 | 0.0 | 0.064 | 52.042 | 0.771 | −3 | −30.05 | 0.09 |
| 23.00 | 26.38 | 1.932 | 60.285 | 0.0 | 0.064 | 52.095 | 0.772 | −3 | −30.79 | 0.10 |
| 24.00 | 27.51 | 1.928 | 60.222 | 0.0 | 0.064 | 52.149 | 0.774 | −4 | −31.47 | 0.10 |
| 25.00 | 28.65 | 1.924 | 60.156 | 0.0 | 0.064 | 52.206 | 0.775 | −4 | −32.11 | 0.11 |
| 26.00 | 29.79 | 1.919 | 60.088 | 0.0 | 0.064 | 52.265 | 0.777 | −4 | −32.70 | 0.11 |
| 27.00 | 30.92 | 1.915 | 60.017 | 0.0 | 0.064 | 52.326 | 0.779 | −4 | −33.25 | 0.12 |
| 28.00 | 32.06 | 1.910 | 59.944 | 0.0 | 0.064 | 52.390 | 0.780 | −4 | −33.76 | 0.12 |
| 29.00 | 33.19 | 1.905 | 59.869 | 0.0 | 0.064 | 52.456 | 0.782 | −4 | −34.23 | 0.13 |

TABLE D-continued

| THLC DEG | THCMC DEG | TLC MEV | PC MEV/C | BRHOC KGCM | BETA | 1/VC NS/M | JAC | DTC/DTH KEV/DEG | THLD DEG | TLD MEV |
|---|---|---|---|---|---|---|---|---|---|---|
| 30.00 | 34.32 | 1.901 | 59.791 | 0.0 | 0.064 | 52.523 | 0.784 | −5 | −34.65 | 0.13 |
| 31.00 | 35.45 | 1.895 | 59.711 | 0.0 | 0.063 | 52.594 | 0.786 | −5 | −35.05 | 0.14 |
| 32.00 | 36.58 | 1.890 | 59.629 | 0.0 | 0.063 | 52.666 | 0.788 | −5 | −35.40 | 0.14 |
| 33.00 | 37.71 | 1.885 | 59.544 | 0.0 | 0.063 | 52.740 | 0.790 | −5 | −35.72 | 0.15 |
| 34.00 | 38.83 | 1.879 | 59.457 | 0.0 | 0.063 | 52.817 | 0.792 | −5 | −36.02 | 0.15 |
| 35.00 | 39.96 | 1.874 | 59.369 | 0.0 | 0.063 | 52.896 | 0.795 | −5 | −36.28 | 0.16 |
| 36.00 | 41.08 | 1.868 | 59.278 | 0.0 | 0.063 | 52.976 | 0.797 | −5 | −36.51 | 0.16 |
| 37.00 | 42.20 | 1.862 | 59.185 | 0.0 | 0.063 | 53.059 | 0.799 | −5 | −36.71 | 0.17 |
| 38.00 | 43.32 | 1.856 | 59.089 | 0.0 | 0.063 | 53.144 | 0.802 | −6 | −36.89 | 0.17 |
| 39.00 | 44.44 | 1.850 | 58.992 | 0.0 | 0.063 | 53.232 | 0.804 | −6 | −37.05 | 0.18 |
| 40.00 | 45.56 | 1.844 | 58.893 | 0.0 | 0.063 | 53.321 | 0.807 | −6 | −37.18 | 0.19 |
| 41.00 | 46.67 | 1.838 | 58.792 | 0.0 | 0.062 | 53.412 | 0.809 | −6 | −37.29 | 0.19 |
| 42.00 | 47.79 | 1.831 | 58.689 | 0.0 | 0.062 | 53.505 | 0.812 | −6 | −37.37 | 0.20 |
| 43.00 | 48.90 | 1.825 | 58.585 | 0.0 | 0.062 | 53.601 | 0.815 | −6 | −37.44 | 0.21 |
| 44.00 | 50.01 | 1.818 | 58.478 | 0.0 | 0.062 | 53.698 | 0.818 | −6 | −37.49 | 0.21 |

11B(P,N)11C
11.006562( 1.007277,   1.008665) 11.008142   QA= 1.   QC= 0.
QGND= -2.765+-  0.001 MEV
TA= 5.230 MEV PA= 99.206 MEV/C  BETAA= 0.105   1/VA= 31.724 NS/M
T IN CM= 4.790 MEV   S= 125.344 GEV**2
EX= 0.000 MEV   RXN THRESHOLD= 3.018 MEV

| THLC DEG | THCMC DEG | TLC MEV | PC MEV/C | BRHOC KGCM | BETA | 1/VC NS/M | JAC | DTC/DTH KEV/DEG | THLD DEG | TLD MEV |
|---|---|---|---|---|---|---|---|---|---|---|
| 0.00 | 0.00 | 2.416 | 67.423 | 0.0 | 0.072 | 46.603 | 0.768 | 0 | 0.00 | 0.04 |
| 0.50 | 0.57 | 2.416 | 67.423 | 0.0 | 0.072 | 46.603 | 0.768 | 0 | −1.06 | 0.04 |
| 1.00 | 1.14 | 2.416 | 67.422 | 0.0 | 0.072 | 46.604 | 0.768 | 0 | −2.12 | 0.04 |
| 1.50 | 1.71 | 2.416 | 67.420 | 0.0 | 0.072 | 46.605 | 0.768 | 0 | −3.18 | 0.04 |
| 2.00 | 2.28 | 2.416 | 67.418 | 0.0 | 0.072 | 46.607 | 0.768 | 0 | −4.23 | 0.05 |
| 2.50 | 2.85 | 2.415 | 67.414 | 0.0 | 0.072 | 46.609 | 0.768 | 0 | −5.27 | 0.05 |
| 3.00 | 3.42 | 2.415 | 67.414 | 0.0 | 0.072 | 46.612 | 0.768 | 0 | −6.31 | 0.05 |
| 3.50 | 3.99 | 2.415 | 67.406 | 0.0 | 0.072 | 46.615 | 0.768 | 0 | −7.34 | 0.05 |
| 4.00 | 4.56 | 2.414 | 67.400 | 0.0 | 0.072 | 46.619 | 0.768 | 0 | −8.37 | 0.05 |
| 4.50 | 5.13 | 2.414 | 67.394 | 0.0 | 0.072 | 46.623 | 0.768 | 0 | −9.38 | 0.05 |
| 5.00 | 5.71 | 2.413 | 67.387 | 0.0 | 0.072 | 46.628 | 0.769 | −1 | −10.38 | 0.05 |
| 5.50 | 6.28 | 2.413 | 67.380 | 0.0 | 0.072 | 46.633 | 0.769 | −1 | −11.36 | 0.05 |
| 6.00 | 6.85 | 2.412 | 67.371 | 0.0 | 0.072 | 46.639 | 0.769 | −1 | −12.34 | 0.05 |
| 6.50 | 7.42 | 2.412 | 67.362 | 0.0 | 0.072 | 46.645 | 0.769 | −1 | −13.29 | 0.05 |
| 7.00 | 7.99 | 2.411 | 67.352 | 0.0 | 0.072 | 46.652 | 0.769 | −1 | −14.24 | 0.05 |
| 7.50 | 8.56 | 2.410 | 67.342 | 0.0 | 0.071 | 46.659 | 0.770 | −1 | −15.16 | 0.05 |
| 8.00 | 9.13 | 2.409 | 67.331 | 0.0 | 0.071 | 46.667 | 0.770 | −1 | −16.07 | 0.05 |
| 8.50 | 9.70 | 2.409 | 67.319 | 0.0 | 0.071 | 46.675 | 0.770 | −1 | −16.96 | 0.05 |
| 9.00 | 10.27 | 2.408 | 67.306 | 0.0 | 0.071 | 46.684 | 0.770 | −1 | −17.83 | 0.05 |
| 9.50 | 10.84 | 2.407 | 67.293 | 0.0 | 0.071 | 46.693 | 0.771 | −1 | −18.69 | 0.05 |
| 10.00 | 11.41 | 2.406 | 67.279 | 0.0 | 0.071 | 46.703 | 0.771 | −2 | −19.52 | 0.06 |
| 10.50 | 11.97 | 2.405 | 67.264 | 0.0 | 0.071 | 46.713 | 0.771 | −2 | −20.34 | 0.06 |
| 11.00 | 12.54 | 2.404 | 67.249 | 0.0 | 0.071 | 46.724 | 0.772 | −2 | −21.14 | 0.06 |
| 11.50 | 13.11 | 2.402 | 67.232 | 0.0 | 0.071 | 46.735 | 0.772 | −2 | −21.91 | 0.06 |
| 12.00 | 13.68 | 2.401 | 67.216 | 0.0 | 0.071 | 46.746 | 0.772 | −2 | −22.67 | 0.06 |
| 12.50 | 14.25 | 2.400 | 67.198 | 0.0 | 0.071 | 46.759 | 0.773 | −2 | −23.41 | 0.06 |
| 13.00 | 14.82 | 2.399 | 67.180 | 0.0 | 0.071 | 46.771 | 0.773 | −2 | −24.12 | 0.06 |
| 13.50 | 15.39 | 2.397 | 67.161 | 0.0 | 0.071 | 46.784 | 0.773 | −2 | −24.82 | 0.06 |
| 14.00 | 15.96 | 2.396 | 67.141 | 0.0 | 0.071 | 46.798 | 0.774 | −2 | −25.50 | 0.06 |
| 14.50 | 16.53 | 2.394 | 67.121 | 0.0 | 0.071 | 46.812 | 0.774 | −2 | −26.15 | 0.07 |
| 15.00 | 17.09 | 2.393 | 67.100 | 0.0 | 0.071 | 46.827 | 0.775 | −3 | −26.79 | 0.07 |

What is claimed is:

1. A method for detecting the presence of a predetermined amount of oxygen and nitrogen in a luggage type container as a screening technique for determining the presence of an explosive in the container, comprising:

generating and accelerating a monoenergetic beam of protons at a neutron generating target, rapidly and periodically subjecting the proton beam to an energy degrading medium upstream of the neutron generating target to thereby selectively degrade the energy of the protons of the proton beam during the time the medium is in place, while allowing the energy of the protons of the proton beam to remain at the original energy when the degrading medium is removed, directing the energy variant proton beam at the neutron generating boron target to generate an energy variant neutron beam of predetermined intensity from a proton-neutron reaction, the neutron beam containing on resonant neutrons at a resonant energy of the nuclei of an element selected from the group including oxygen and nitrogen, and containing off resonant neutrons outside the resonant energy of the nuclei of oxygen or nitrogen, directing the neutron beam at a scintillator detector means downstream of the neutron target material, moving a container to be examined in a predetermined path of travel and in a direction along the orthogonal axis relative to the neutron beam and the scintillator detector means and upstream of the scintillator detector means to progressively irradiate the container with the neutron beam, first detecting, measuring and comparing on resonant neutrons removed by interactions with nuclei of one of said elements, and off resonant neutrons passing through the luggage container, for determining the presence of a predetermined level of said one element, and, in response to a determination of the presence of a predetermined level of said one element in the container, then detecting, measuring and comparing on resonant neutrons removed by interactions with nuclei of the other of said elements, and off resonant neutrons passing through the luggage container for determining the presence of a predetermined level of said other element, displaying the measured and compared difference as informational data on a display screen.

2. A method for detecting the presence of a predetermined amount of oxygen and nitrogen in a luggage type container as a screening technique for determining the presence of an explosive in the container, comprising:

generating and accelerating a monoenergetic beam of protons at a neutron generating target, rapidly and periodically subjecting the proton beam to an energy degrading medium upstream of the neutron generating target to thereby selectively degrade the energy of the protons of the proton beam during the time the medium is in place, while allowing the energy of the protons of the proton beam to remain at the original energy when the degrading medium is removed, directing the energy variant proton beam at the neutron generating boron target to generate an energy variant neutron beam from a proton-neutron reaction, the energy variant neutron beam containing on resonant neutrons at a resonant energy of the nuclei of an element selected from the group including oxygen and nitrogen, and containing off resonant neutrons outside the resonant energy of the nuclei of oxygen or nitrogen, directing the neutron beam at a scintillator detector means downstream of the neutron target material, moving a container to be examined in a predetermined path of travel and in a direction along the orthogonal axis relative to the neutron beam and the scintillator detector means and upstream of the scintillator detector means to progressively irradiate the container with the neutron beam, first detecting, measuring and comparing the on resonant neutrons removed by interaction with oxygen nuclei and off resonance neutrons passing through the suitcase, for determining the presence of a predetermined level of oxygen in the container, and, in response to a determination of the presence of a predetermined level of oxygen in the container, then detecting, measuring and comparing the on resonant neutrons removed by interaction with nitrogen nuclei and off resonant neutrons passing through the suitcase for determining the presence of a predetermined level of nitrogen in the container, displaying the measured and compared difference as informational data on a display screen.

3. The method as defined in claim 2 wherein the boron target has a thickness dimension of a magnitude to generate on resonant neutrons having an energy width corresponding to the energy width of the selected resonance of the nuclei of the element being interrogated.

4. The method as defined in claim 3 wherein the selected resonance for oxygen is 2.35 Mev.

5. The method as defined in claim 3 wherein the selected resonance for nitrogen is 1.82 Mev.

6. The method as defined in claim 2 wherein the average time for the interrogation of a luggage container is approximately 3.6 seconds.

7. Apparatus for detecting the presence of a predetermined amount of oxygen and nitrogen in a luggage or suitcase type containers as a screening technique for determining the presence of an explosive in the containers as the suitcase type containers and are supported on and moved by conveyor means relative the detecting apparatus, comprising;

a device for generating and accelerating a mono-energetic beam of protons, energy degrading means being operative to rapidly and periodically selectively degrade the energy of the protons of the proton beam during an energy degrading interval, and allowing the energy of the protons of the proton beam to remain at the original energy during an energy non-degrading interval, a boron target positioned downstream of the energy degrading means and disposed in confronting relation with respect to the energy variant proton beam whereby an energy variant neutron beam is produced from the interaction of the proton beam and boron target by a proton-neutron reaction, the generated energy variant neutron beam containing on resonant neutrons at a resonant energy of the nuclei of an element selected from the groups including oxygen and nitrogen, the energy variant neutron beam also containing off resonant neutrons outside the resonant energy of the nuclei of oxygen and nitrogen, scintillator photo-multiplier detection means positioned downstream of the boron target and in confronting relation with respect to the energy variant neutron beam, the suitcase type containers to be screened being moved in a direction along the orthogonal axis relative to be energy variant neutron beam and the scintillator photo-multiplier detector means whereby the suitcase containers are successively irradiated with the energy variant neutron beam, said scintillator photo-multiplier means first detecting, measuring and comparing on resonant neutrons removed by interaction with nuclei of one of said elements, and off resonant neutrons passing through the luggage container for determining the presence of quantity of said one element, said scintillator photo-multiplier means thereafter detecting, measuring and comparing on resonant neutrons removed by interaction with nuclei of the other of said elements, and off resonant neutrons outside the resonance of the nuclei of said other element for detecting the presence and quantity of said other element, and display means for displaying the meausred and compared differences as informational data on a display screen.

8. The apparatus as defined in claim 7 wherever the energy degrading means comprises an energy degrading foil, means mounting said energy degrading foil for movement into and out of the proton beam.

* * * * *